United States Patent
Dowlatkhah

(10) Patent No.: US 9,635,120 B2
(45) Date of Patent: Apr. 25, 2017

(54) CONSOLIDATED NETWORK REPOSITORY (CNR) FOR STORING DATA ASSOCIATED WITH DIFFERENT COMMUNICATION NETWORK PLATFORMS

(71) Applicant: AT&T Intellectual Property I, L.P., Atlanta, GA (US)

(72) Inventor: Sangar Dowlatkhah, Alpharetta, GA (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 0 days.

(21) Appl. No.: 14/709,101

(22) Filed: May 11, 2015

(65) Prior Publication Data

US 2015/0271283 A1 Sep. 24, 2015

Related U.S. Application Data

(63) Continuation of application No. 12/635,092, filed on Dec. 10, 2009, now Pat. No. 9,058,369.
(60) Provisional application No. 61/159,674, filed on Mar. 12, 2009.

(51) Int. Cl.
*G06F 15/16* (2006.01)
*H04L 29/08* (2006.01)
*G06F 17/30* (2006.01)
*H04L 29/06* (2006.01)
*H04W 8/18* (2009.01)

(52) U.S. Cl.
CPC .... *H04L 67/2823* (2013.01); *G06F 17/30566* (2013.01); *H04L 67/10* (2013.01); *H04L 67/42* (2013.01); *H04L 69/08* (2013.01); *H04W 8/18* (2013.01)

(58) Field of Classification Search
CPC ..... H04L 67/2823; H04L 67/10; H04L 67/42; H04L 69/08; G06F 17/30566; H04W 8/18
USPC .................................................. 709/213, 219
See application file for complete search history.

(56) References Cited

U.S. PATENT DOCUMENTS

| | | | |
|---|---|---|---|
| 6,377,993 B1 * | 4/2002 | Brandt | G06F 11/0709 707/E17.107 |
| 6,505,241 B2 | 1/2003 | Pitts | |
| 6,601,090 B1 | 7/2003 | Gurijala et al. | |
| 7,720,819 B2 | 5/2010 | Lazzaro et al. | |
| 7,844,710 B2 | 11/2010 | Rathi | |
| 8,020,073 B2 | 9/2011 | Emma et al. | |
| 8,195,649 B2 * | 6/2012 | Doyle | G06F 17/30477 707/722 |
| 8,359,323 B2 * | 1/2013 | Klets | G06F 9/541 707/758 |

(Continued)

OTHER PUBLICATIONS

Office Action dated Dec. 23, 2011 for U.S. Appl. No. 12/609,951, 12 pages.

(Continued)

*Primary Examiner* — Viet Vu
(74) *Attorney, Agent, or Firm* — Amin, Turocy & Watson, LLP

(57) ABSTRACT

An architecture that can facilitate support for or integration of disparate communications networks. The architecture can embody a consolidated network repository (CNR) that can be configured as a single logical repository that can potentially be configured according to a common schema regardless of the type or number of schema employed by the disparate communications networks.

20 Claims, 14 Drawing Sheets

(56) References Cited

U.S. PATENT DOCUMENTS

| | | |
|---|---|---|
| 2002/0032775 A1 | 3/2002 | Venkataramaiah et al. |
| 2003/0055826 A1 | 3/2003 | Graham |
| 2004/0236694 A1* | 11/2004 | Tattan .................. G06F 21/32 705/50 |
| 2005/0033820 A1 | 2/2005 | Steindl |
| 2005/0203939 A1 | 9/2005 | Kartzmark et al. |
| 2005/0267901 A1 | 12/2005 | Irlen |
| 2006/0163340 A1* | 7/2006 | Leiper .................. G06F 19/322 235/375 |
| 2007/0140447 A1 | 6/2007 | Arnoff et al. |
| 2008/0013533 A1 | 1/2008 | Bogineni et al. |
| 2008/0034080 A1 | 2/2008 | Chamaraj et al. |
| 2008/0222646 A1 | 9/2008 | Sigal et al. |
| 2008/0249988 A1 | 10/2008 | Chaitanya et al. |
| 2008/0256020 A1 | 10/2008 | Wakefield |
| 2008/0270164 A1 | 10/2008 | Kidder et al. |
| 2008/0306883 A1 | 12/2008 | Baffier et al. |
| 2009/0137227 A1 | 5/2009 | Bencheikh |
| 2009/0307230 A1 | 12/2009 | Fujiyama et al. |
| 2010/0094847 A1* | 4/2010 | Malan .................. H04L 69/18 707/705 |
| 2010/0257507 A1 | 10/2010 | Warren |
| 2011/0173219 A1 | 7/2011 | Bent et al. |
| 2012/0238292 A1 | 9/2012 | Walker et al. |

OTHER PUBLICATIONS

Office Action dated Nov. 19, 2012 for U.S. Appl. No. 12/635,092, 20 pages.

Office Action dated Mar. 13, 2013 for U.S. Appl. No. 13/544,580, 21 pages.

Final Office Action dated Jul. 3, 2013 for U.S. Appl. No. 12/635,092, 17 pages.

Final Office Action dated May 21, 2014 for U.S. Appl. No. 12/635,092, 16 pages.

Office Action dated Aug. 27, 2014 for U.S. Appl. No. 12/635,092, 17 pages.

Office Action dated Oct. 22, 2013 for U.S. Appl. No. 12/635,092, 14 pages.

* cited by examiner

CONSOLIDATED NETWORK REPOSITORY (CNR) FOR STORING DATA ASSOCIATED WITH DIFFERENT COMMUNICATION NETWORK PLATFORMS

CROSS-REFERENCE TO RELATED APPLICATIONS

This application is a continuation of, and claims priority to each of, U.S. patent application Ser. No. 12/635,092, entitled, "CONSOLIDATED NETWORK REPOSITORY (CNR)", filed Dec. 10, 2009 (now U.S. Pat. No. 9,058,369, issued on Jun. 16, 2015), which claims the benefit of priority to U.S. Provisional Patent Application No. 61/159,674, filed Mar. 12, 2009, entitled "CONSOLIDATED NETWORK REPOSITORY (CNR)." The entireties of these applications are hereby incorporated herein by reference.

BACKGROUND

Today, there are many types of communications networks that cater to different needs of subscribers or compete for subscribers across platforms. Some examples include wireless communications networks, wireline communications networks, Internet Protocol (IP) Multimedia Subsystem (IMS) communications networks, broadband communications networks, and so on. Many providers exist in the market today that offer services for more than one type of communication network, thus, it could be beneficial to such providers to integrate or converge the various networks into a single platform.

However, conventional communications networks vary widely in terms of implementation, feature set, applications, or services. Generally, each network maintains an application-specific repository to store subscriber information, and each such repository typically operates according to a different schema.

DETAILED DESCRIPTION

Figure 1:
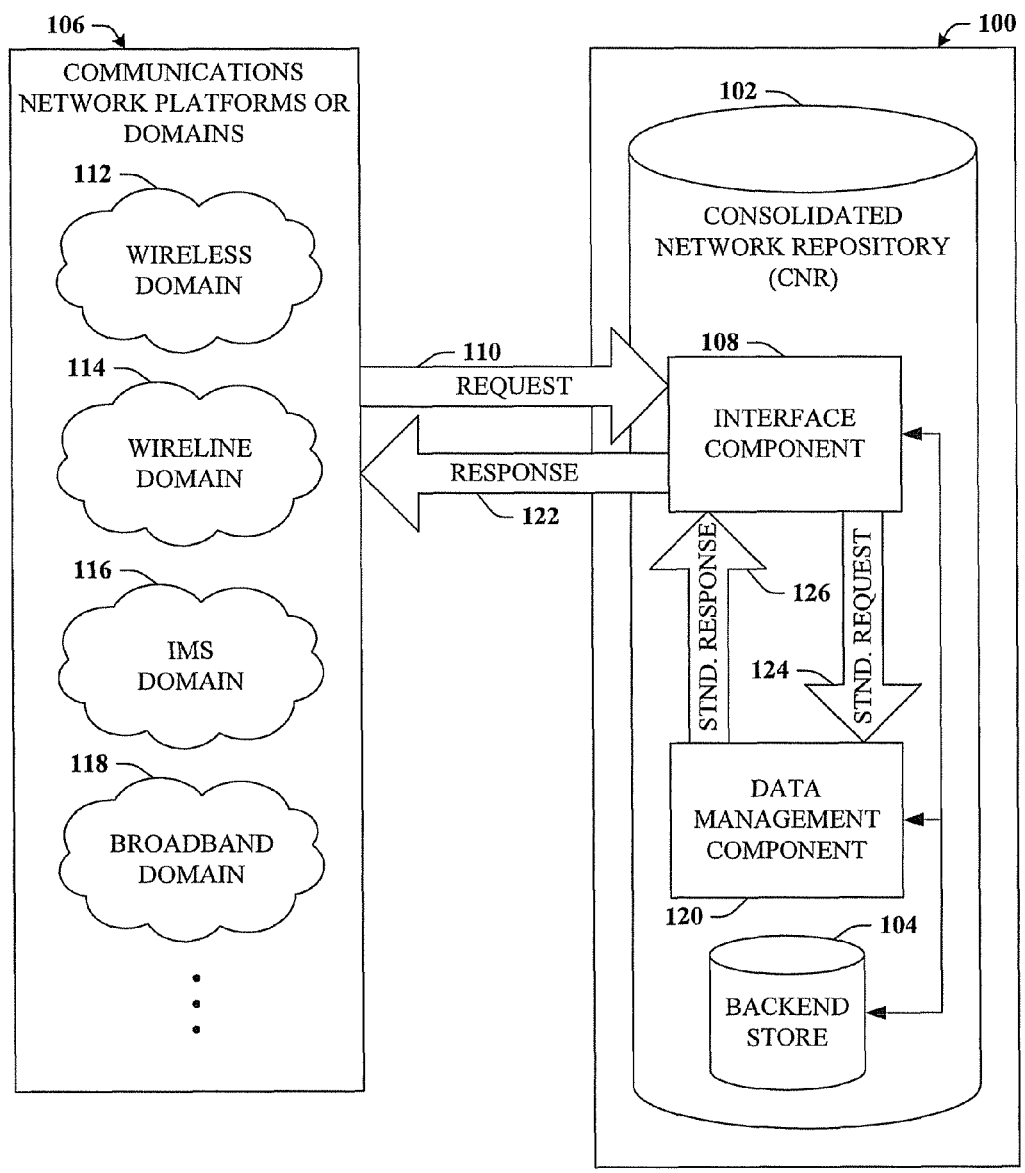
FIG. 1 is a block diagram of a system that can facilitate support of disparate communications networks.

The subject matter disclosed herein, in one aspect thereof, comprises an architecture that can facilitate support for or integration of disparate communications networks. In accordance therewith and to other related ends, the architecture can include a consolidated network repository (CNR) that can be configured as a single logical repository. The CNR can be structured to in tiers or layers, thus including, e.g., a backend layer that can physically store data, an interface layer that can operate as a single point of integration for all data request, and a data management layer that can act as an intermediary between the interface layer and the backend layer.

In more detail, the backend layer can physically house data associated with multiple disparate communications network platforms, which can be stored according to a common schema regardless of or independent of the subscribing network platform's preferred or required schema. The interface layer can be configured to support multiple communications network platforms, wherein the interface layer can receive a request associated with an access to the backend store. Further, the data management layer can receive the request, access the backend layer, and serve the request.

In one or more aspects of the disclosed subject matter, the interface component can convert the received request from the application-specific format designated by the platform originating the request to a standardized format expected by the data management layer. Hence, the data management layer and the backend layer can be independent of any protocol or implementation of the originating platform, while the originating platform likewise need have no special knowledge of the internal operation of the CNR.

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

As used in this application, the terms "system," "component," "interface," and the like are intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. An interface can include input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the disclosed subject matter.

As used herein, the terms "infer" or "inference" generally refer to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Further, terms like "user equipment," "mobile station," "mobile," subscriber station," "access terminal," "terminal," "handset," and similar terminology, generally refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "cell," "cell site," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Referring now to the drawing, with reference initially to FIG. 1, system 100 that can facilitate support of disparate communications networks is depicted. Generally, system 100 can include consolidated network repository (CNR) 102 that can be configured as a single logical repository. For example, although CNR 102 can be single logical repository for data, CNR 102 can be distributed throughout numerous storage devices or facilities as well as over multiple geographic regions, which is further detailed in connection with FIG. 3 infra.

CNR 102 can include backend store 104 that can maintain data associated with multiple disparate communications network or platform domains such as component domains illustrated by reference numeral 106 and discussed further herein, or any other suitable domains or network platforms. Backend store 104 can be one or more physical storage devices or facilities that can physically maintain data for various converged networks, such as data relating to subscribers to the various networks or the like. It should be appreciated that backend store 104 can be embodied as substantially any type of memory, including but not limited to volatile or non-volatile, steady-state, sequential access, structured access, or random access and so on. Additional detail relating to backend store 104 can be found with reference to FIG. 2C.

Furthermore, CNR 102 can include interface component 108, which is further discussed in connection with FIG. 2A. However, briefly, interface component 108 can be configured to support multiple communications network platforms/domains (e.g., domains 106 . . . ), wherein interface component 108 can receive request 110 associated with an access to backend store 104. For example, the multiple communications network platform/domains 106 can include all or a portion of wireless domain 112, wireline domain 114, an Internet Protocol (IP) Multimedia Subsystem (IMS) domain 116, a broadband domain 118, or any other existing or later developed network platform. Thus, interface component 108 can support request 110 from third generation partnership project (3GPP) wireless network domains/platform as well as from 2G networks, 4G networks, Long Term Evolution (LTE) networks, Evolved Packet System (EPS) networks, voice-over-IP (VOIP) networks, Internet queries and so on, as well as applications or services thereof.

Thus, in accordance with the described subject matter, a communications network providers, for example, can converge multiple application-specific data stores for substantially any of a variety of communications networks into a single data store (e.g., backend store 104) that can increase reliability, speed, efficiency, redundancy, among other features further discussed infra while maintaining scalability or extensibility and decreasing maintenance or implementation costs. Moreover, converging multiple network domains can provide more robust capabilities for intra-network operation, and can be an important feature for subscribers.

In accordance with the above-mentioned benefits, subscriber data (or other data included in backend 104) can be harmonized across the multiple network platforms/domains 106 into one logical data layer, which can mitigate data inconsistencies and/or unnecessary data duplications. Furthermore, by employing only a single logical database (e.g., backend 104), only one point of integration (e.g., interface component 108) need be exposed for all applications, which can significantly simplify subscriber and service provisioning or upkeep. Moreover, wasted network capacity can be reduced or eliminated by standardizing/consolidating network architecture, which can reduce server and storage requirements as well as sub-optimal usage of, e.g., database software licenses. In addition, the ability to share such resources can save on energy costs, floor space, or operations, and can reduce administration and management/maintenance (OA&M) costs, e.g., by centralizing expertise or other resources. Still another benefit can be simplified or more expedient implementation or roll out for additional or future networks or services, which can be more readily integrated with an existing CNR.

As noted previously, interface component 108 can operate as a single point of integration for multiple communications network platforms 106 or any application or service thereof. Accordingly, interface component 108 can support substantially any type of request 110 regardless of the type or purpose or from which platform 106 or application request 110 originates. For example, interface component 108 can support request 110 from a wireless switch, from a social networking site or service, or a 9-1-1 call. In other words, interface component 108 can mimic any potential application interface such as 3GPP or lightweight directory access protocol (LDAP). Hence, other or existing portions of a communications network (e.g., platforms 106) need have no special knowledge of the structure, operation, or behavior of CNR 102, but rather can behave as though accessing its own associated database.

Thus, regardless of the type or nature of request 110, interface component 108 can handle request 110 as well as an appropriate action or response. In one or more aspect of the disclosed subject matter, such can be accomplished by including in interface component 108 multiple frontend interfaces that can facilitate support of the multiple platforms/domains 106. For example, a disparate frontend for each supported platform 106 or application can be included in interface component 108, which is further detailed in connection with FIG. 2A.

In addition, CNR 102 can further include data management component 120, which is discussed in more detail with reference to FIG. 2B. Data management component 120 can receive the request (or an abstraction of the request), and then access backend store 104 in order to serve the request, which can be forwarded to the requestor by interface component 108. It should be appreciated that due to a wide range of potential types or protocols for request 110, in one or more aspect, interface component 108 can convert request 110 to standardized request 124 formatted according to a standard interface protocol expected by data management component 120. Hence, data management component 120 need have no special knowledge of the platform 106 that initiates request 110 or any protocol or application thereof. Rather, standardized request 124 can be abstracted according to a desired schema, potentially customized for backend store 104. Upon retrieving the appropriate data (or other results) from backend 104, data management component 120 can transmit a standardized response 126 to interface component 108. Interface component 108 can then reverse the abstractions performed on request 110 when converting to standardized request 124 to construct response 122 (in the format or protocol expected by the domain which initiated request 110) from standardized response 126. Additionally or alternatively, response 122 can be constructed by data management component 120 (e.g., by a data adaption function component detailed infra with reference to FIG. 2B), forwarded to interface component 108 and/or delivered to the request initiator.

Figure 2A:
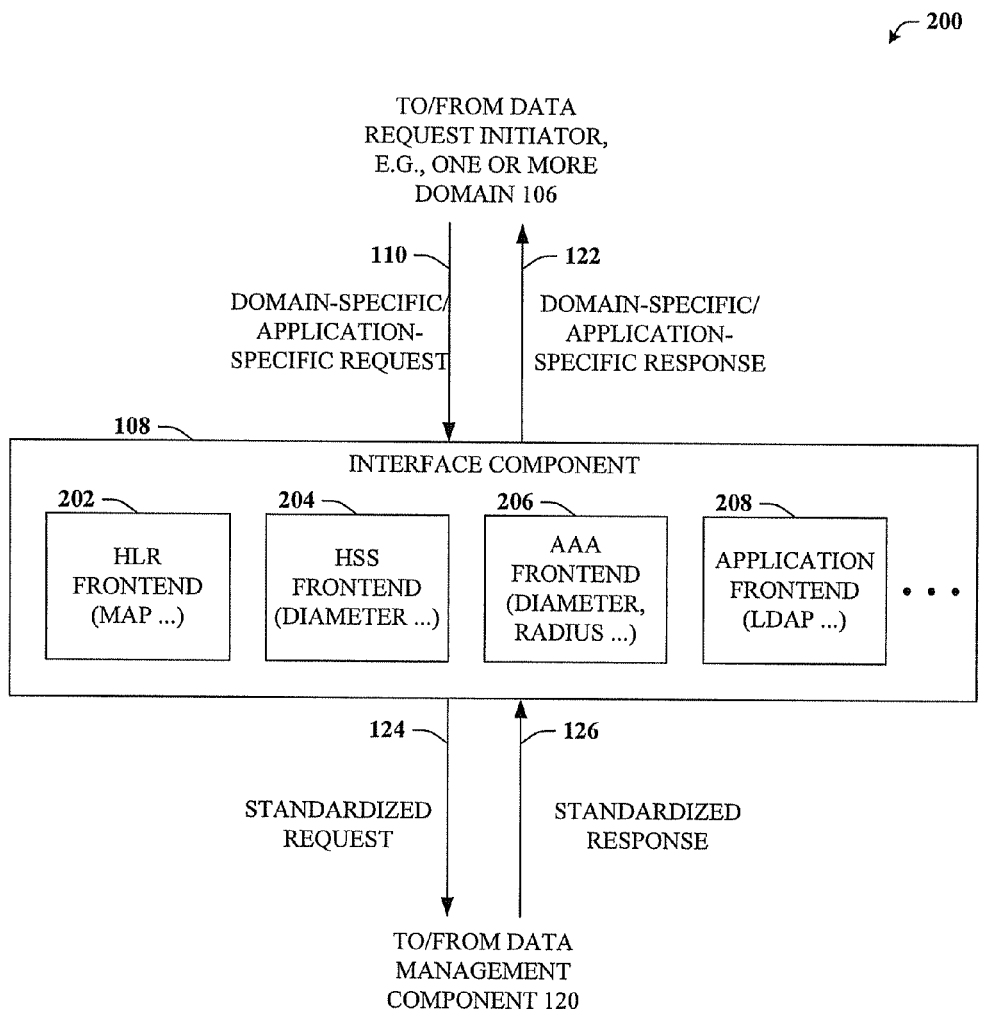
FIG. 2A depicts a block diagram of a system that illustrates an example of interface component in more detail.

Turning now to FIG. 2A, system 200 illustrates an example of interface component 108 in more detail. As previously discussed, request 110 can be received from an element of one or more domain 106 and response 122 can be returned to that element. In either case, the request 110 or response 122 can be domain- or application-specific. Likewise, request 110 can be converted from domain-specific to standardized request 124, while standardized response 126 can be translated to a domain- or application-specific response 122.

As further noted above, interface component 108 can include multiple frontend interfaces, four examples of which are depicted here, although it should be appreciated that substantially any number of additional frontend interfaces can be included in interface component 108 or extended after initial implementation. In particular, interface component 108 can include any or all of Home Location Register (HLR) frontend 202, Home Subscriber Server (HSS) frontend 204, Authentication, Authorization, and Accounting (AAA) frontend 206, application interface frontend 208, as well as other suitable frontends, all or a portion of which can be data-less frontends.

In more detail, HLR frontend 202 can employ Mobile Application Part (MAP) protocol to facilitate an interface to network elements configured according to a wireless domain 112 communication standard. Thus, one or more HLR frontend 202 can support various wireless-based protocols or applications for interface component 108. On the other hand, HSS frontend 204 can employ DIAMETER protocol to facilitate an interface to network elements configured according to an IMS domain 116 communication standard. Hence, one or more HSS frontend 204 can support various IMS-based protocols or applications for interface component 108.

Similarly, AAA frontend 206 can employ either DIAMETER or Remote Authentication Dial In User Service (RADIUS) protocol to facilitate an interface to network elements that utilize one or more AAA-based application, while application interface frontend 208 can be configured to support at least one of AAA, Equipment Identity Register (EIR), Common Architecture for Real-Time Services (CARTS), Lightweight Directory Access Protocol (LDAP), Application Server (AS), or the like. Appreciably, as briefly discussed supra, the illustrated as well as any other suitable frontend can be data-less, however, such is not necessarily a requirement.

Moreover, in one or more aspects of the disclosed subject matter, the multiple frontends (e.g., 202-208 . . . ) can be configured to support protocols including at least one of C, D, Cx, Dx, LDAP, Simple Object Access Protocol (SOAP), Extensible Markup Language (XML), Hypertext Transfer Protocol (HTTP), Simple Network Management Protocol (SNMP) and so forth, as well as N+K redundancy.

Figure 2B:
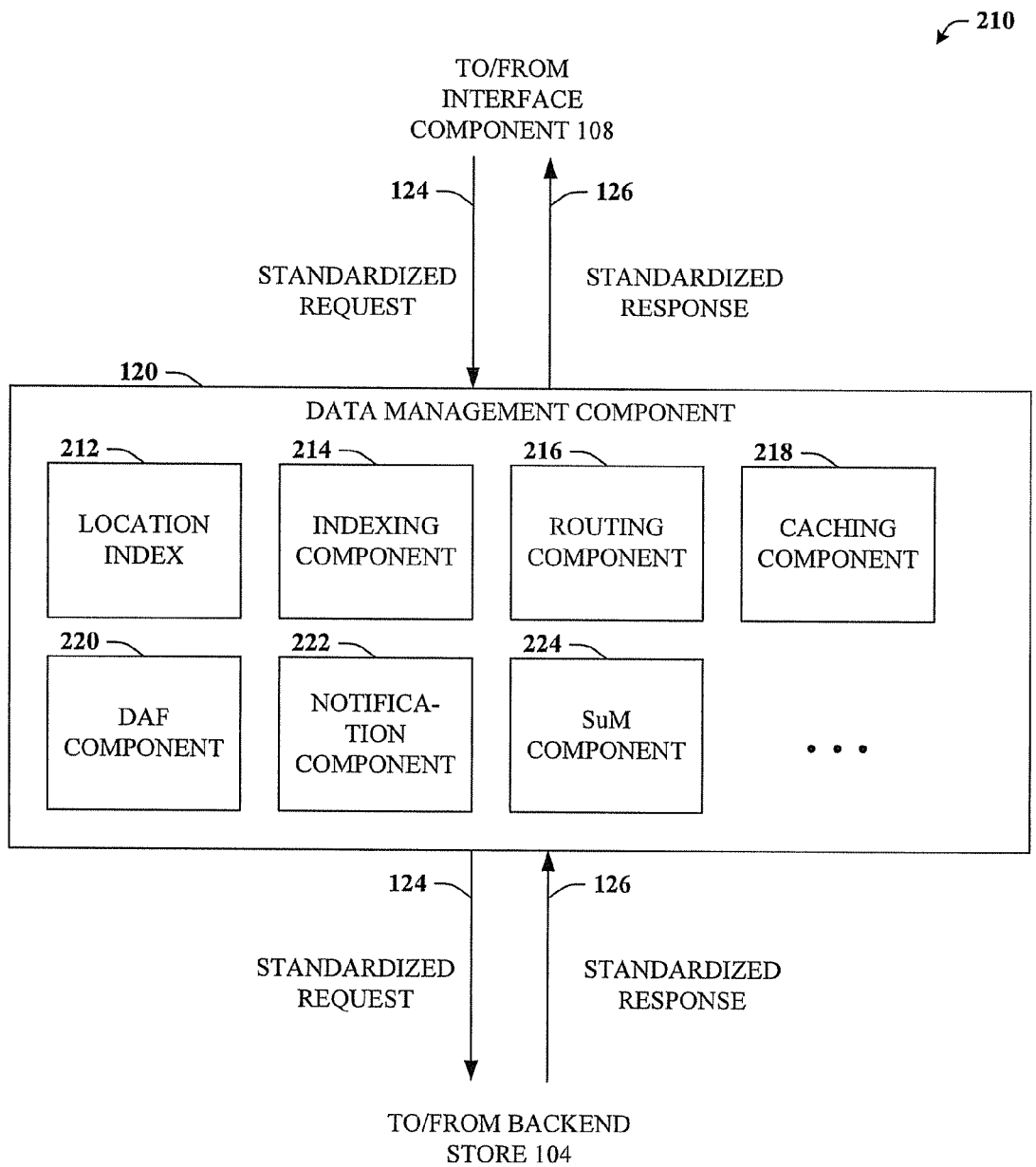
FIG. 2B illustrates a block diagram of a system that depicts an example data management component in greater detail.

Referring now to FIG. 2B, system 210 depicts an example data management component 120 in greater detail. Data management component 120 can facilitate serving request 110 as substantially described supra. Given that request 110 can relate to retrieval of, e.g., subscriber profile information from backend store 104, data management component 120 will typically be responsible for keeping track of where in backend store 104 requested data resides. Hence, in one or more aspects, data management component 120 can be configured to maintain location index 212, which can describe the location within backend store 104 of requested data.

In addition, in one or more aspect, data management component 120 can further include any or all of indexing component 214 (for which location index 212 can be portion), routing component 216, caching component 218, data adaption function (DAF) component 220, notification component 222, SuM component 224 as well as other suitable components or modules. By way of illustration, at least one of indexing component 214 or routing component 216 can be configured to maintain location index 212 or to operate as a subscriber directory for all or a portion of frontends included in interface component 108.

Caching component 218 can be configured to temporarily store data retrieved from the backend store, which can be efficiently re-accessed in order to, e.g., reduce traffic to backend store 104 and/or to minimize response delay or latency for CNR 102. Caching component 218 can be employed for caching information available to mobile or non-mobile networks, network management systems or the like. For example, data can be cached in response to request (s) for a data element or request(s) for an update to a data element and in accordance with a cache retention protocol. Request(s) (e.g., request 110) for a data element of an update to a data element can be received from a set of external networks, mobile or otherwise, that can interface a protocol layer. The protocol layer can include various signaling protocols associated with various network components or services, or application data. The protocol layer can also deliver the request(s) to a data management layer in a format compatible with the source/originator (network component, application server, etc.) of the request(s). A data management layer (e.g., comprised of multiple data management components 120, detailed infra) can format such requests in accordance with a predetermined signaling protocol and can further allow caching, as well as other data storage functionality in accordance with the predetermined protocol. The data management layer can be functionally coupled to a backend storage layer (e.g., comprised of multiple backend stores 104, discussed infra), which can be a distributed, heterogeneous data storage layer. The backend storage layer can include all or substantially all network data that can be accessed or generated by network components or application servers that can access the protocol layer or an interface layer (e.g., comprised of multiple interface components 108, detailed infra). In addition, backend storage layer also can include data related to network management systems, and components therein; such systems functionally coupled to the data manager layer.

With respect to caching, the cache retention can establish a versioning protocol and a set of timers that determine a period to elapse prior to removal of a version of the cached data element. In addition, a master record of a data element can be updated with a most recent version of cached data element if a retention timer expires. Updates to a cached data element can be effectuated if an integrity assessment determines that recordation of an updated version of the data element preserves operational integrity of one or more network components or services. The assessment can be based on integrity logic that establishes a set of rules that evaluate operational integrity of a requested update to a data element. Retention protocol and integrity logic are configurable; a network component can supply a configuration or such configuration can be effected autonomously.

DAF component 220 can be configured to adapt data retrieved from backend store 104 for data structures or data representations expected by an application that originated request 122. Accordingly, DAF component 220 can, e.g., simplify integration of existing repositories into a common data model or schema. Likewise, notification component 222 can be configured to support subscribe or notify mechanisms in order to, e.g., allow one or more of the multiple frontend interfaces included in interface component 108 of changes to data included in backend store 104. Last to be described, data management component 120 can also include SuM component 124, which can be configured to interface to provisioning components or to coordinate updates associated with CNR 102. Appreciably, data management component 120 can include other suitable components as well.

Figure 2C:
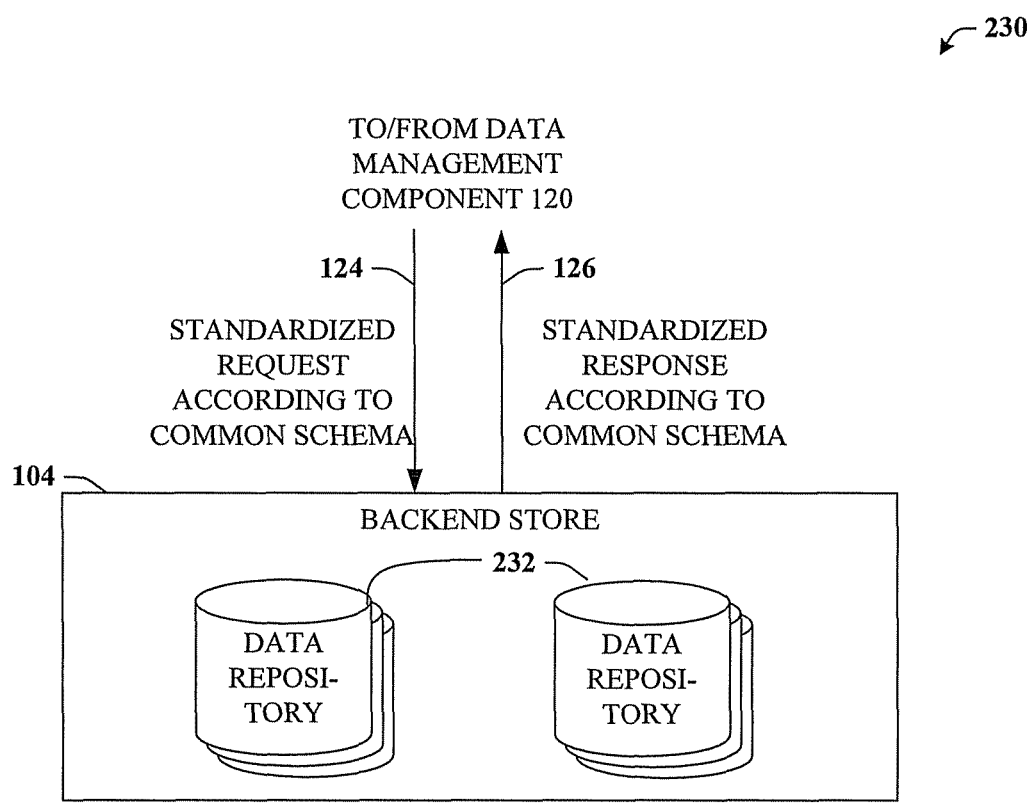
FIG. 2C is a block diagram of a system that provides an example of a backend store in more particular detail.

Referring briefly to FIG. 2C, system 230 provides an example of backend store 104 in more particular detail. For example, as depicted, backend store 104 can include multiple physical data repositories 232 in order to, e.g., redundantly store all or portions of data associated with the multiple disparate communications network platforms 106. As introduced above, it should be appreciated that backend store 104 can be configured with a single, common schema, which can greatly simply accesses and make for a much more robust system than, e.g., merely merging multiple repositories of individual networks, all with distinct schema. Accordingly, standardized request 124 and standardized response 126 transmitted to or received from data management component 120 can be formatted according to this common schema.

Hence, backend store 104 can provide permanent storage for CNR 102 data in redundant data repositories 232. Therefore, any data entity or entry can be stored in two or more data repositories 232. Moreover, data repositories 232 can be distributed over two or more sites and data repositories 232 can be replicated on several servers in different locations in order to provide geo-redundancy. For example, replication across three servers can provide redundancy even when one of the servers is down due to maintenance or for another reason. All of the above can be better appreciated with reference to FIG. 3. In addition, data repositories 232 can be based on nonvolatile memory, volatile memory, or a combination thereof. Moreover, data included in data repositories 232 can be partitioned either by a subscriber schema or a subset of subscriber schema in order to, e.g., provide robust scalability. Furthermore, it should be appreciated that in connection with components 212-216 of FIG. 2B, the originator of request 110 need not have any knowledge of which repository 232 a subscriber profile or other requested data is stored. Rather, such can be seamlessly and transparently handled by data management component 120.

Figure 3:
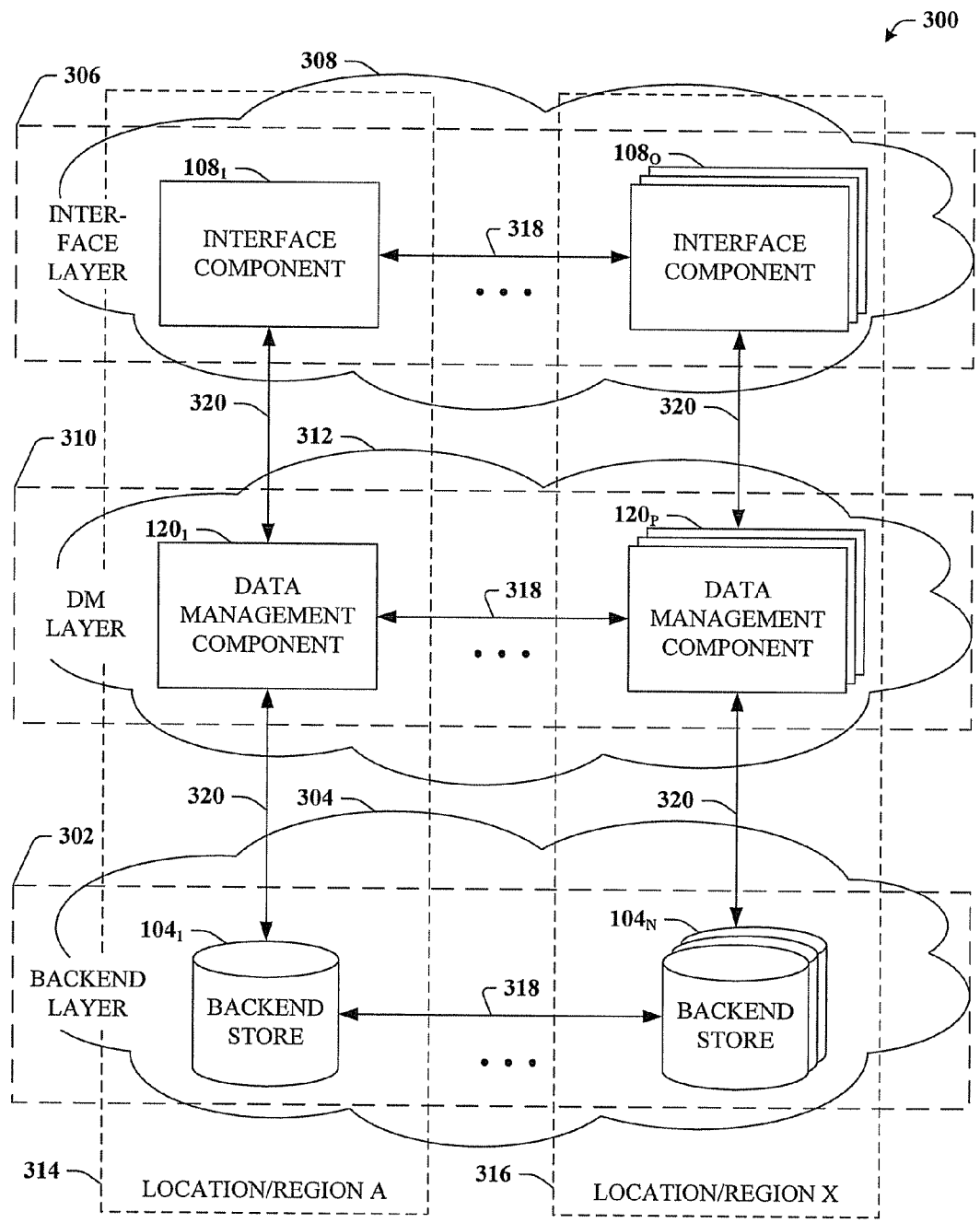
FIG. 3 illustrates a block diagram of a system that depicts a distributed CNR in discrete layers.

Turning now to FIG. 3, system 300 that depicts a distributed CNR in discrete layers is provided. Although much of the above has been directed toward a simplified conceptual CNR residing at a single location, it should be understood that CNR 102 can comprise multiple instances of the components detailed previously and span numerous geographic regions even though CNR 102 can be organized as a single logical repository. For example, CNR 102 can include backend layer 302 that can comprise multiple backend stores $104_1$-$104_N$ (referred to hereinafter either individually or collectively as backend store(s) 104), wherein N can be substantially any positive integer. Moreover, in one or more aspects, the backend stores 104 included in backend layer 302 can be included in first logical wide area network (WAN) 304, e.g., organized as a separate domain or network, potentially with each backend store 104 as a peer to other backend stores 104. It should be appreciated that, depending upon the application for the disclosed subject matter, backend layer 302 (as well as any other layer) can be networked via a local area network (LAN) rather than by WAN 304. Such could be utilized, e.g., for applications or networks that cater to urban services or the like.

Similarly, CNR 102 can include interface layer 306, wherein interface layer 306 can include multiple interface components $108_1$-$108_O$, wherein O can be substantially any positive integer. All or a portion of interface components 108 included in interface layer 306 can be included in second logical WAN 308 (or a suitable LAN) and, thus, structured as a separate or independent network or domain with respect to first logical WAN 304. In addition, CNR 102 can further comprise data management layer 310 that can include multiple data management components $120_1$-$120_P$, wherein P can be substantially any positive integer. Appreciably, positive integers N, O, and P can be, but need not be, equal, as will be further detailed below. Moreover, as with backend layer 302 and interface layer 306, data management layer 310 can be organized as a disparate logical WAN, network, or domain, in particular as third logical WAN 312.

In accordance with the above, it should be readily apparent that CNR 102 can be physically distributed among multiple geographic locations, wherein at least a first portion of one or more layers (e.g., layers 302, 306, 310) included in CNR 102 can reside at a first geographic location, say location/region A (denoted by reference numeral 314) and at least a second portion of the one or more layers included in CNR 102 can reside at a second geographic location, e.g., location/region X (labeled with reference numeral 316. Thus, each geographic location or site (e.g., locations 314, 316, . . . ) can include all or a portion of the elements of system 100 discussed in connection with FIGS. 1-2C, or in some case multiple instances of such elements (e.g., as depicted with respect to location 316).

In accordance with the above, it is apparent that interface layer 306 can consist of multiple frontends which can provide a single point of access to CNR 102 whether interfacing to 2G, 3G, EPS, IMS network elements or other applications like AAA MIND, Common Architecture for Real-Time Services (CARTS), AS or the like. Moreover, as noted supra, these frontends can be data-less, and thus emulate or appear, e.g., as a HLR to mobility wireless domains, as an IMS HSS to IMS networks, or as an application repository to schema evolution through an extensible, re-usable and flexible framework (SERF) layer. Hence, CNR 102 or portions thereof can be implemented as though it were a legacy HLR or IMS HSS without any major changes in the subject network given the robust support for substantially any interface, standard or otherwise.

Likewise, backend layer 302 can be where all or a portion of data managed by CNR 102 is physically stored. Data repositories 232 associated with backend layer 302 can be physically distributed across various regions of a service provider's network, where actual data is stored and/or replicated. Hence, the number of subscribers as well as portions of one or more subscribers' data can be flexibly distributed to meet various partitioning requirements. For example, by limiting the number of subscribers for any one data repository 232, server load can be architected according to expectation as part of CNR 102 implementation or design. Moreover, load balancing or data location optimization can be effectively accomplished in as well.

In one or more aspects of the disclosed subject matter, the multiple backend stores included in backend layer 302 can be networked via first logical WAN 304 such that a particular backend store 104 included in backend layer 302 can be configured to communicate with other backend stores 104 in a horizontal fashion via first logical WAN 304 or with an associated data management component 120 in a vertical fashion. Similarly, multiple interface components 108 included in interface layer 306 can be networked via second logical WAN 308 such that a particular interface component 108 included in the interface layer 306 can be configured to communicate with other interface components 108 in a horizontal fashion via second logical WAN 308 or with an associated data management component 120 in a vertical fashion. Furthermore, multiple data management components 120 included in the data management layer 310 can be networked via third logical WAN 312 such that a particular data management component 120 included in data management layer 312 can be configured to communicate with other data management components 120 in a horizontal fashion via third logical WAN 312 or with an associated interface component 108 or an associated backend store 104 in a vertical fashion.

It should be understood that communicating in a horizontal fashion is illustrated by reference numeral 318 for enabling, e.g., any or all elements within a layer of CNR 102 to communicate with other like elements over the associated logical WAN, e.g., by way of peer-to-peer communication. Accordingly, updates to one of the elements (e.g., one of the interface components 108 within interface layer 306, etc.) can be propagated to other like elements via the associated logical WAN. Thus, it should be appreciated that, in accordance with one or more aspects of the disclosed subject matter, at least one layer included in CNR 102 can be configured to be independently extensible or updateable such that an extension or update to the at least one layer need not require any associated extension or update to other layers included in CNR 102.

Similarly, communicating in a vertical fashion is depicted by reference numeral 320 and can relate to communication among elements within a single geographic location, region, or site, such as location 314, 316, and so on. Moreover, while location 314 is depicted with exactly one element in each layer (e.g., one interface component 108 in interface layer 306, one data management component 120 in data management layer 310 . . . ) whereas location 316 is illustrated to include multiple elements for each layer, it should be understood that a given site is not necessarily restricted to such topology. For example, a given location or site can include substantially any number of elements within a particular layer independent of the number of elements in another layer. Furthermore, in addition to the redundancy of data repositories 232 within a particular site introduced supra, redundancy can also be offered between regions should a particular region become unreachable because of some catastrophic issue, for example.

With the foregoing in mind, it can be readily appreciated that the disclosed subject matter can provide numerous advantages for existing communications networks or for consolidating or converging multiple networks whether existing or subsequently rolled out. For example, CNR 102 can, in general, provide a single logical repository for all data associated with all integrated networks. CNR 102 can be distributed for ready scalability or enhanced performance, as well as load balanced internally with local and geographical redundancy and/or robust fault resilience or fault recovery.

With respect to data interfaces (e.g., interface component 108 or interface layer 306) associated with CNR 102, all such interfaces can be scalable and independent of data storage architecture, with the ability to add new interfaces for ready extensibility. The interfaces can also support or promote standards-based elements or protocols, and support any such protocols that are targeted, such as, e.g., IMS HSS/SLF and mobility HLR, LDAP, IPv4, IPv6, and so on.

Regarding data storage (e.g., backend store 104, backend layer 302, data repositories 232), such storage can be independent of the data interface architecture. Additionally, given the ready extensibility of CNR layers, geographic distribution, and logical mapping, data storage need have no inherent capacity limit. In addition, CNR 102 can provide support for data synchronization and protection of data integrity and/or reliability. Furthermore, given that data storage can be according to a single common schema, the schema can be standardized and published, yet remain flexible and configurable to, e.g., support independent application schemas.

With respect to application support, CNR 102 can provide the ability to consolidate existing mobility, BVoIP, and/or CVoIP applications data repositories. Moreover, CNR 102 can remain extensible to support future applications such as, e.g., World Wireless Congress (WWC) as well as potentially any existing service or support required by regulatory agencies, such as E911, CALEA, NS/EP, LNP, WPS NPA splits, and so forth.

Furthermore, CNR 102 can provide robust security options as well. For instance, backend stores 104 and/or repositories 232 can be resident in a trusted domain, wherein access can be limited only to elements within the trusted domain. Additionally, data protection relating to, e.g., stored credentials, one-way encryption, or the like, can be enforced and data transmission can be facilitated in accordance with ASPRs.

Figure 4:
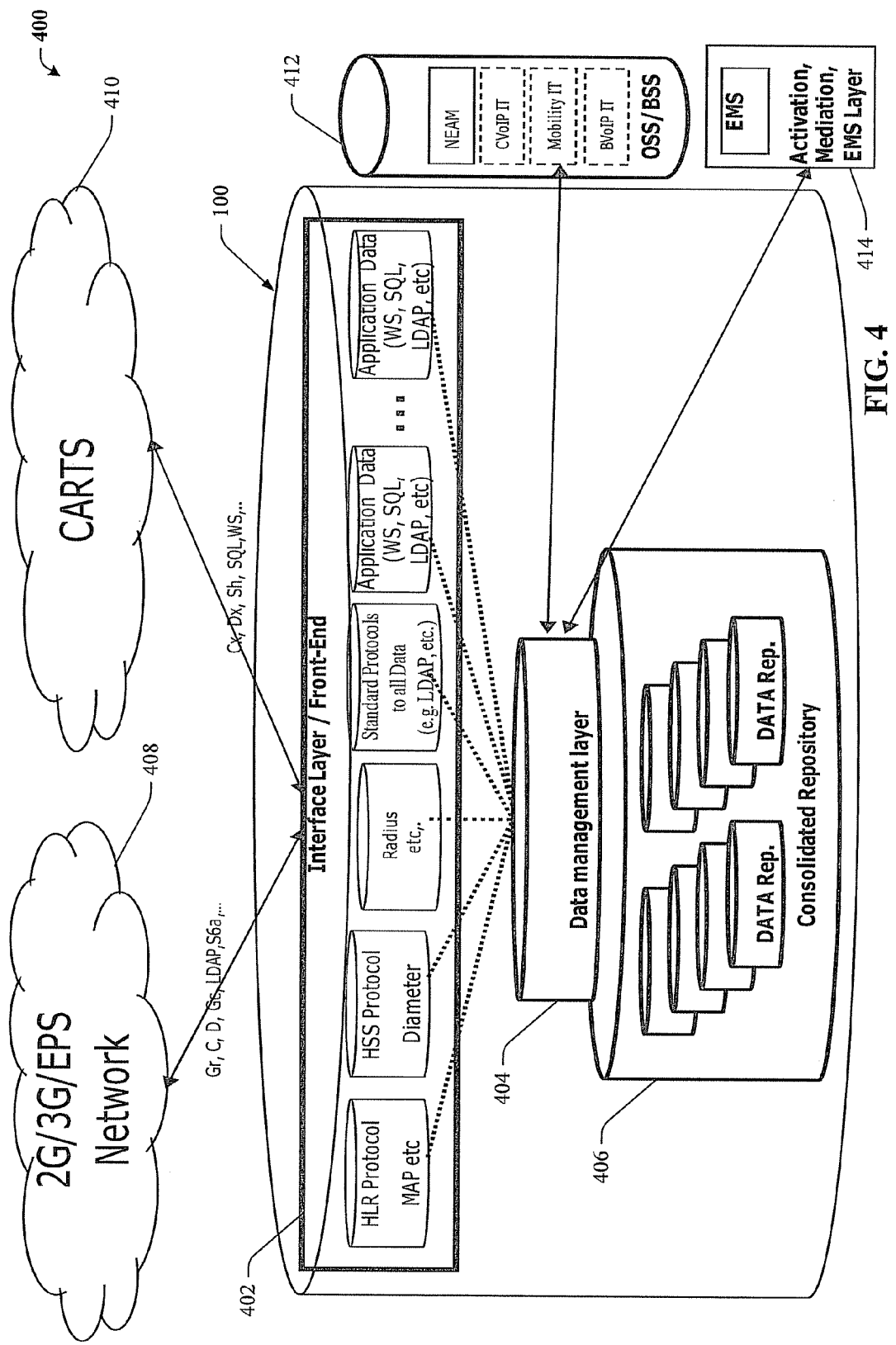
FIG. 4 is a block diagram of a system that illustrates various aspects of an exemplary consolidated network repository.

With reference now to FIG. 4, system 400 illustrates various aspects of an exemplary consolidated network repository. Appreciably, the depicted consolidated network repository can be substantially similar to that detailed supra. For example, the consolidated network repository can include frontend interface layer 402, data management layer 404, and backend repository layer 406, similar to that which was previously described. Typical communication networks 408 and the Common Architecture for Real-Time Services (CARTS) 410 can access the CNR through frontend interface layer 402. System 400 can also include provisioning component 412 and element management component 414, which can relate to accessing the consolidated network repository through data management layer 404.

Frontend interface layer 402 can represent a boundary between the consolidated network repository and the various disparate networks 408 or associated applications (as well as CARTS 410) requiring the services provided by the consolidated network repository. Moreover, frontend interface layer 402 can pass all data to the lower layers for processing and therefore can be a data-less interface layer. Frontend interface layer 402 can also provide interfaces matching existing network data interfaces, hence enabling consolidated network repository integration into a present network as if it were legacy support for existing database systems.

Further, data management layer 404 can receive requests from, or returns responses to, frontend interface layer 402 on one side or submits requests, or receives responses from, backend repository layer 406 on the other side. Data management layer 404 can provide necessary functionality such as but not limited to indexing of data, data caching, application request translation, such as to the lightweight data access protocol (LDAP), and subscriber management. The design of the consolidated network repository can enable data management layer 404 to receive a request for data access with advanced knowledge of the location of the database holding the requested data without any front end processing. Such can be based on, e.g., the physical location of the subscriber, the service or application originating the request, or the location of any other related data stored in the consolidated network repository.

Additionally, data management layer 404 can provide a direct interface to the provisioning applications 412 or the element management applications 414. Providing such lower level interface to the consolidated network repository can allow for simpler provisioning, a greater level of redundancy, or overall resilience to the consolidated network repository architecture. Further, data management layer 404 can also provide for a common data schema by incorporating the schemas of HLR, HSS, or other application servers (AS) into the common data schema.

In one or more aspects of the disclosed subject matter, backend repository layer 406 can be the physical storage location for all network and application data. The backend layer 406 repositories can be distributed across all or a portion of regions of the network, thereby providing for localized storage, potentially with the constraints of multiple and different localized implementations. In one or more aspects, the distributed localized storage can provide for faster or more efficient access to the localized data without necessarily limiting performance of the consolidated network repository or access by remote subscribers. Moreover, potentially any limitations enforced on existing storage systems, such as the number of subscribers per repository can be enforced by the localized storage of the consolidated network repository, if desired. Further, backend repository layer 406 can be redundant as detailed supra, and can be implemented as one or more pairs of storage devices providing either or both geographical or internal redundancy.

In one or more aspects, each layer of the consolidated network repository 400 can be located within the same wide area network (WAN), thereby making peer to peer communication possible. Such a feature can enable the different layered nodes to communicate with each other and perform tasks such as load balancing or data location optimization. For example, consider a subscriber changes residences from one locality to another. The consolidated network repository can detect the fact that the subscriber has relocated and automatically transfer the subscriber's profile or other data to the new more proximate data repository. Appreciably, in such cases, time constraints, such as thirty days in the new location, can be configured to prevent data transfers for temporary moves such as travel or visitations.

Figure 5:
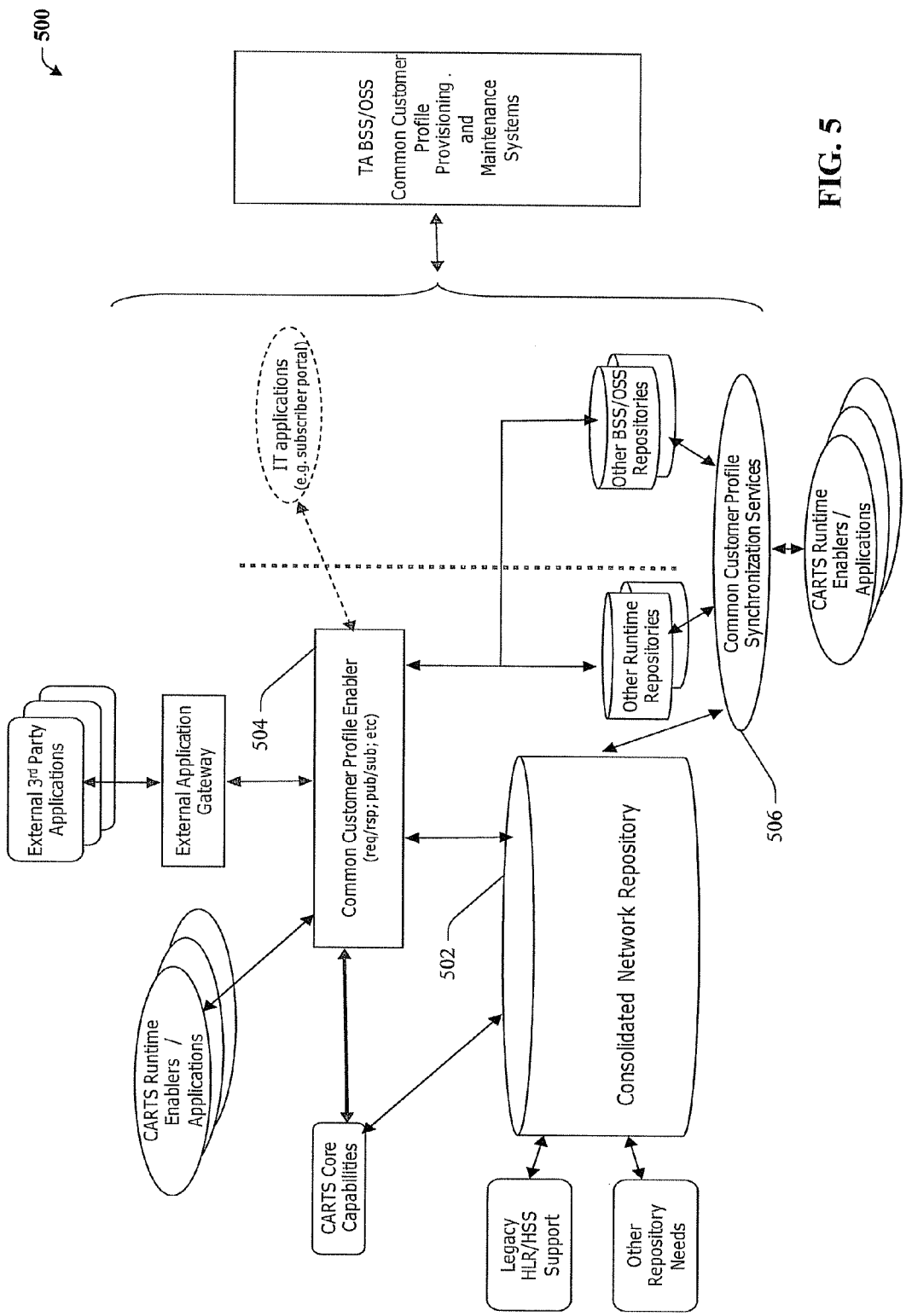
FIG. 5 depicts a block diagram of a system that illustrates additional features or aspect of a consolidated network repository.

Referring now to FIG. 5, system 500 illustrates additional features or aspect of a consolidated network repository. In particular, consolidated network repository 502 is depicted interacting with a common customer profile (CCP) enabler 504 and CCP synchronization services 506. The consolidated network repository 502 can provide support for third party customer applications to maintain subscriber application data in consolidated network repository 502 while also potentially providing all the previously described benefits detailed herein. Further, customer profile provisioning and maintenance systems can be provided access to, but prevented from interacting with application data associated with other customers.

Furthermore, as will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, and in addition to that already described herein, can automate certain mechanisms or processes performed thereby to make portions of the systems and methods more adaptive as well as efficient and intelligent.

It should be further appreciated that the methodologies disclosed throughout this specification are capable of being stored on an article of manufacture to facilitate transporting and transferring such methodologies to computers. The term article of manufacture, as used, is intended to encompass a computer program accessible from any computer-readable device, media, or a carrier in conjunction with such computer-readable device or media.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, industrial controllers and the like, each of which can be operatively coupled to one or more associated devices.

The illustrated aspects of the claimed subject matter can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Suitable combinations of the any of the above should also be included within the scope of communication media derived from computer-readable media and capable of subsequently propagating through electrically conductive media, (e.g., such as a system bus, microprocessor, data port, and the like) and/or non-electrically conductive media (e.g., in the form of radio frequency, microwave frequency, optical frequency and similar electromagnetic frequency modulated data signals).

Figure 6:
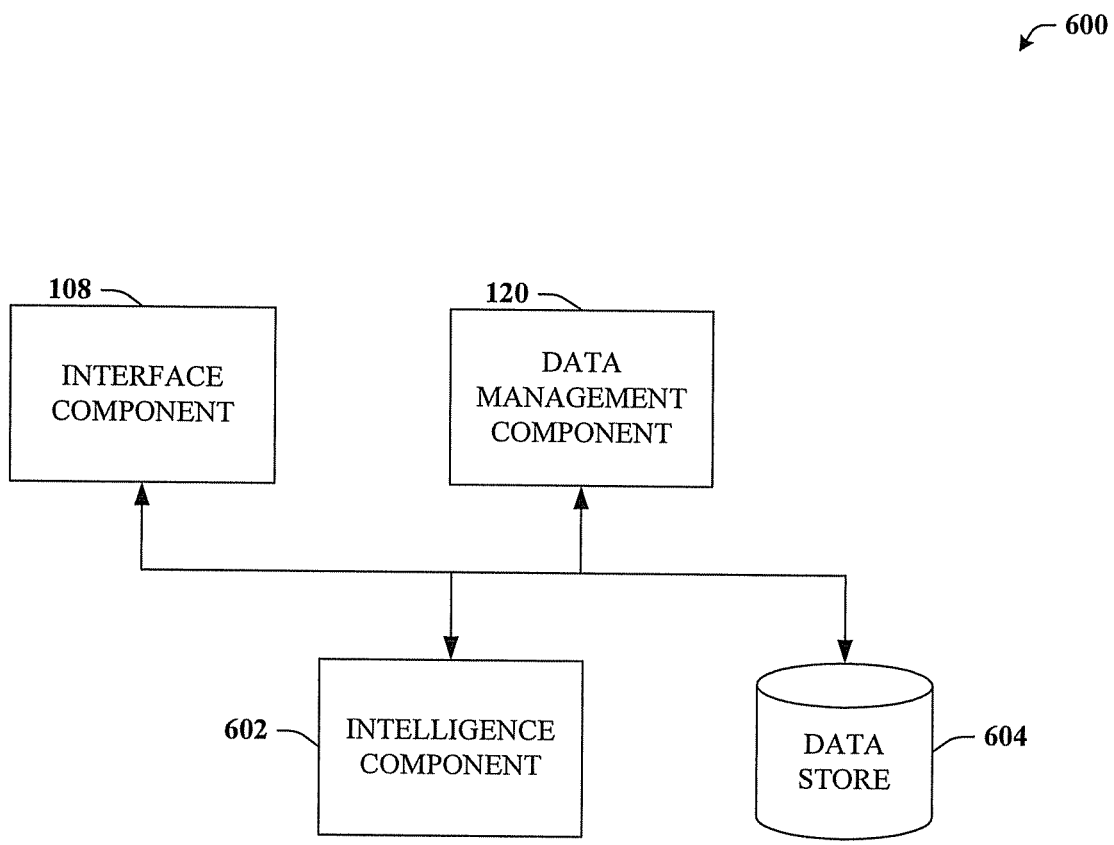
FIG. 6 illustrates a block diagram of a system that can perform or aid with various determinations or inferences.

Now turning to FIG. 6, system 600 that can perform or aid with various determinations or inferences is illustrated. Generally, system 600 can include one or more interface component 108 and/or one or more data management component 120, each as substantially described herein. In addition to what has been described, the above-mentioned components can make intelligent determinations or inferences. For example, Bayesian probabilities or confidence measures can be employed or inferences can be based upon machine learning techniques related to historical analysis, feedback, and/or previous determinations or inferences. For instance, interface component 108 can intelligently determine or infer conversion techniques when generating standardized request 122 based upon application-specific request 110. In addition, data management component 120 can intelligently determine or infer optimal or efficient load balancing or data location management.

In addition, system 600 can also include intelligence component 602 that can provide for or aid in various inferences or determinations. In particular, in accordance with or in addition to what has been described supra with respect to intelligent determinations or inferences provided by various components described herein, e.g., all or portions of interface component 108 or data management component 120. Additionally or alternatively, all or portions of intelligence component 602 can be included in one or more components described herein.

Moreover, intelligence component 602 will typically have access to all or portions of data sets described herein, such as data store 604. As used herein, data store 604 is intended to be a repository of all or portions of data, data sets, or information described herein or otherwise suitable for use with the described subject matter, which can include data resident in backend stores 104. Data store 604 can be centralized, either remotely or locally cached, or distributed, potentially across multiple devices and/or schemas. Furthermore, data store 604 can be embodied as substantially any type of memory, including but not limited to volatile or non-volatile, steady-state, sequential access, structured access, or random access and so on. It should be understood that all or portions of data store 604 can be included in system 100, or can reside at least in part remotely from system 100.

Accordingly, in order to provide for or aid in the numerous inferences described herein, intelligence component 602 can examine the entirety or a subset of the data available and can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the disclosed subject matter.

A classifier can be a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naive Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 7:
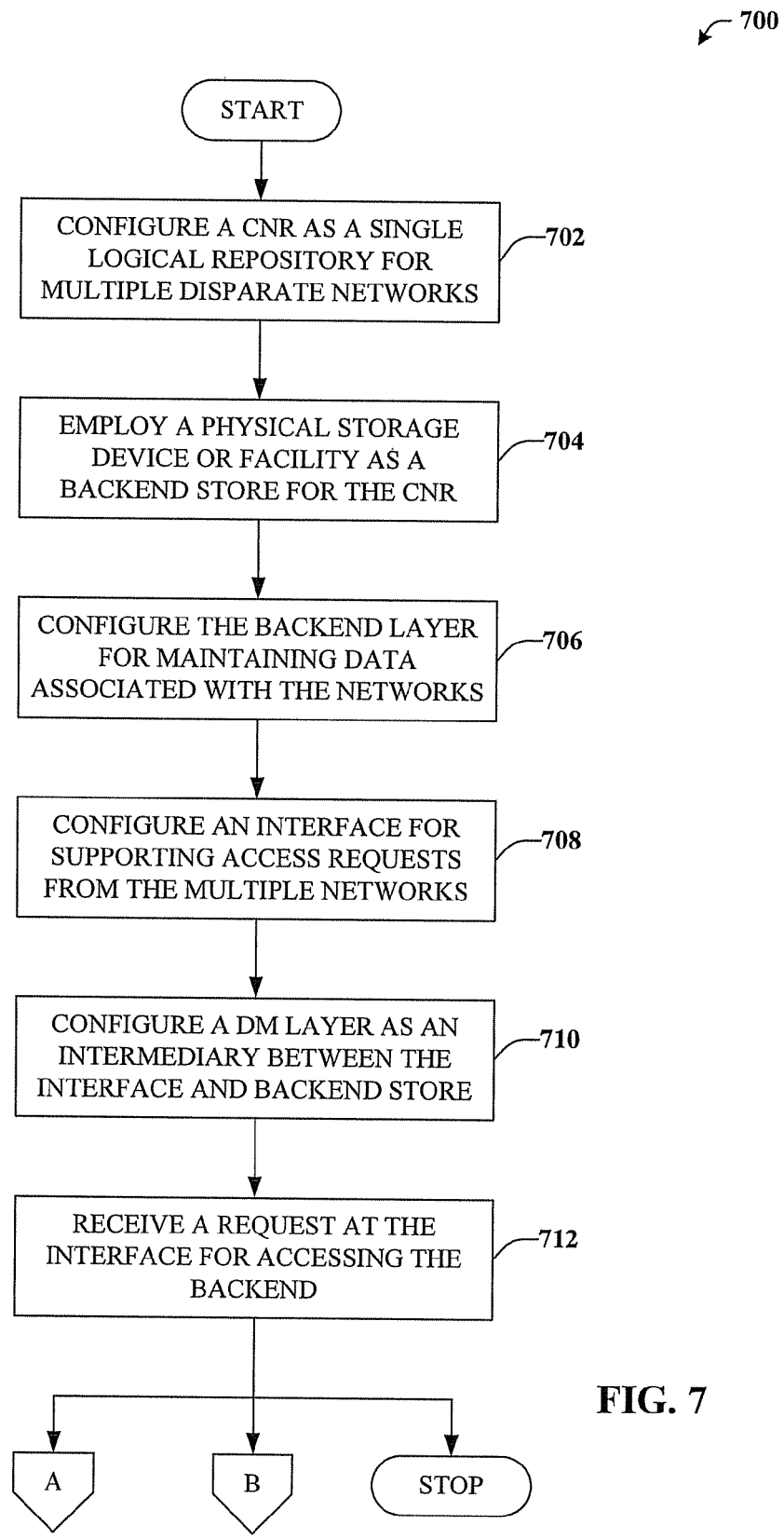
FIG. 7 is an exemplary flow chart of procedures that define a method for integrating multiple disparate communications network platforms.
Figure 8:
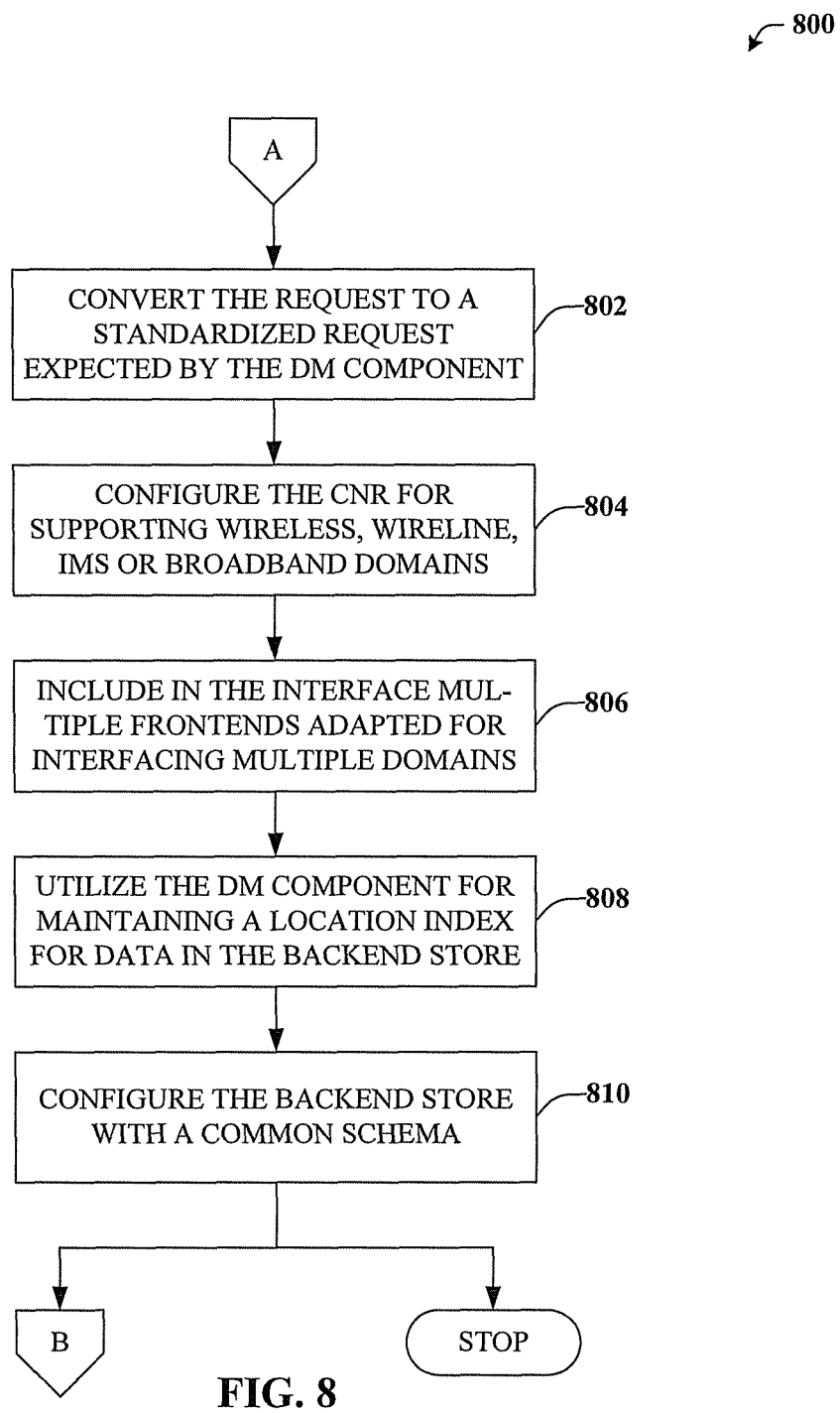
FIG. 8 depicts an exemplary flow chart of procedures defining a method for providing additional features or aspects in connection with integrating multiple disparate communications network platforms.
Figure 9:
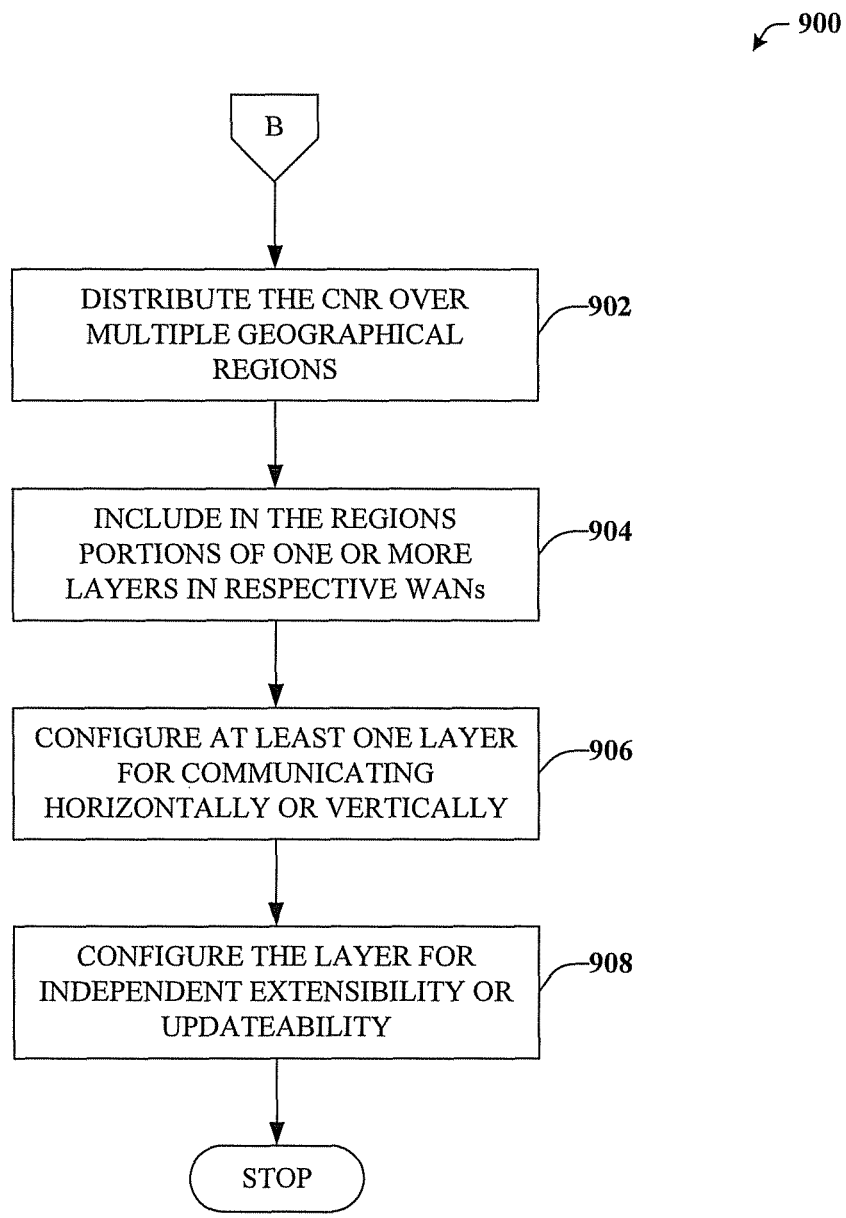
FIG. 9 provides an exemplary flow chart of procedures defining a method for providing additional features or aspects in connection with integrating multiple disparate communications network platforms within a distributed, layered CNR.

FIGS. 7-9 illustrate various methodologies in accordance with the disclosed subject matter. While, for purposes of simplicity of explanation, the methodologies are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the disclosed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring now to FIG. 7, exemplary method 700 for integrating multiple disparate communications network platforms is depicted. Generally, at reference numeral 702, a CNR can be configured as a single logical repository for multiple disparate communications networks. In accordance therewith, at reference numeral 704, one or more physical storage devices or facilities can be employed as a backend layer for the CNR. In particular, the CNR and/or the backend store(s) or layer can include substantially any number of physical drives or storage devices and can be geographically distributed as detail herein.

At reference numeral 706, the backend layer can be configured for maintaining data associated with the multiple disparate communications network domains. Appreciably, such data when existing in disparate networks can stored in a wide variety of schema according to the implementation of those disparate networks, yet such need not be the case with the CNR.

Likewise, at reference numeral 708, an interface layer for the CNR can be configured for supporting access requests from the multiple disparate communications network domains. Such access request can also span a wide range of protocols, service features, and/or applications. Hence, the interface can potentially be configured to handle or support any or all the protocols or applications desired.

In addition, at reference numeral 710, a data management layer that operates as an intermediary between the interface discussed in connection with reference numeral 708 and the backend layer detailed at reference numeral 706. At reference numeral 712, a request associated with an access to the backend store can be received at the interface and, typically, forwarded to the data management component.

Turning now to FIG. 8, exemplary method 800 for providing additional features or aspects in connection with integrating multiple disparate communications network platforms is depicted. For example, at reference numeral 802, the request received at integrating multiple disparate communications network platforms 712 of FIG. 7 can be converted to a standardized request according to a standard protocol expected by the data management component. Appreciably, the standardized protocol can be independent of a domain or application type that originated the request.

At reference numeral 804, the CNR can be configured as the single logical repository for two or more of a wireless domain, a wireline domain, an IMS domain, or a broadband domain. It should be understood that CNR can support other domains as well, with the aforementioned domains intended to serve as concrete examples. At reference numeral 806, multiple frontends can be included into the interface, wherein such frontends can be, respectively, adapted for interfacing with the multiple disparate communications network domains or applications associated therewith.

Regarding reference numeral 808, the data management component can be utilized for maintaining a location index for data included in the backend store. Accordingly, the data management component can be apprised at any given time of the location of subscriber profiles or other data. Whereas at reference numeral 810, the backend store can be configured with a single, common schema. As such, the data in the backed store can be accessed or recalled potentially much more efficiently than if many schemas existed.

With reference now to FIG. 9, exemplary method 900 for providing additional features or aspects in connection with integrating multiple disparate communications network platforms within a distributed, layered CNR is provided. At reference numeral 902, the CNR can be distributed over multiple geographical regions, yet can still retain a logical mapping as a single data store.

At reference numeral 904 at least one backend store can be included in the multiple geographical regions and associated with a first logical WAN that networks the backend layer detailed in connection with reference numeral 702, wherein each backend store distributed over the multiple geographical regions can be connected in peer-to-peer fashion. Likewise, at least one interface component can be included in the multiple geographical regions and associated with a second logical WAN that networks the interface layer of reference numerals 704 and 706. Furthermore, at least one data management component can be included in the multiple geographical regions and associated with a third logical WAN that networks the data management layer discussed in connection with reference numeral 710.

At reference numeral 906, at least one layer (e.g., the interface layer, the data management layer, or the backend layer) of the CNR can be configured for communicating in a horizontal manner via a single logical WAN (e.g., the first, second, or third logical WAN), or in a vertical manner with one or more disparate layer at a same geographical region. Last to be described, at reference numeral 908, the at least one layer can be configured for independent extensibility or updateability.

Figure 10:
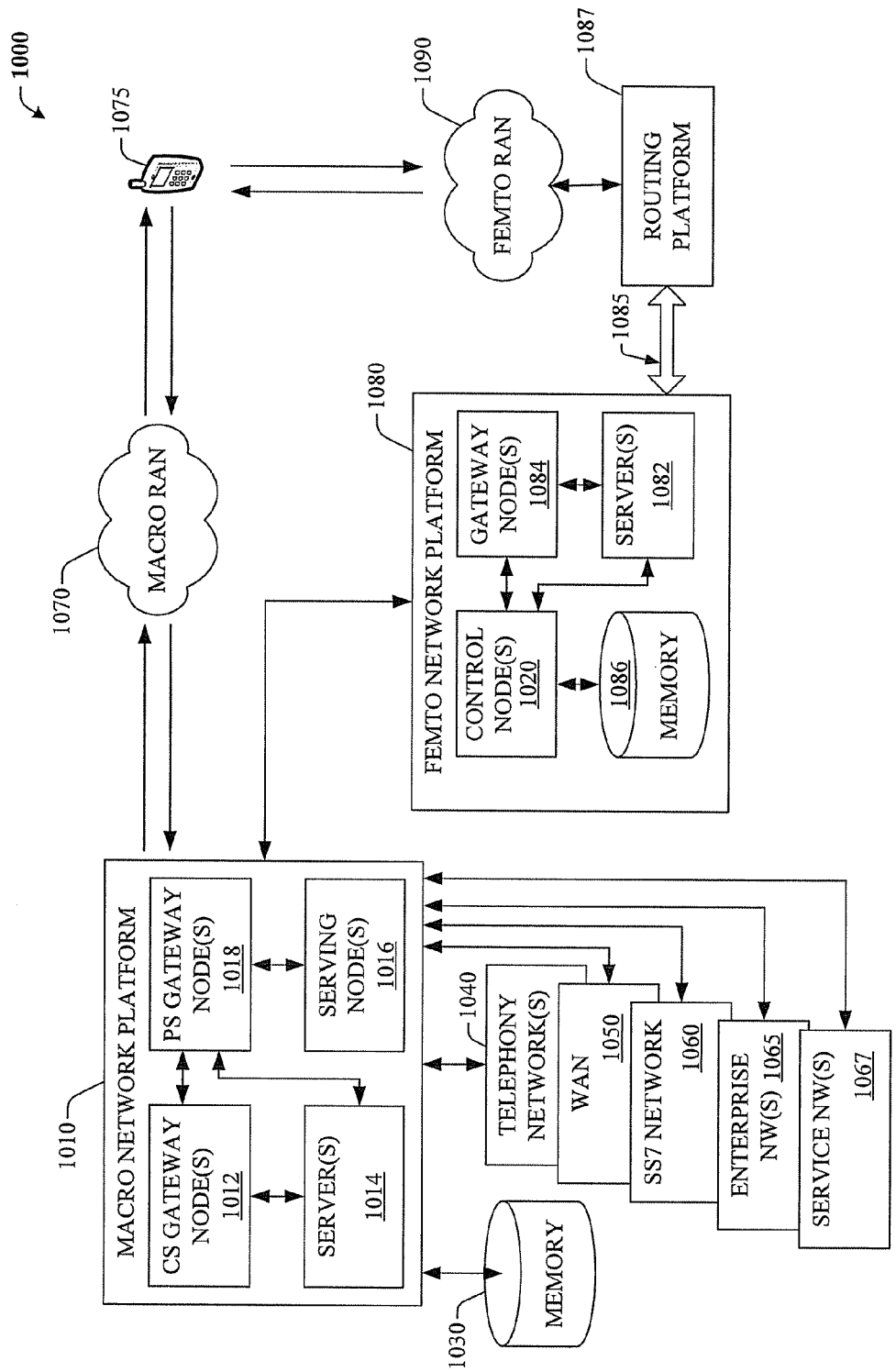
FIG. 10 illustrates an example wireless communication environment with associated components that can enable operation of an enterprise network in accordance with aspects described herein.

To provide further context for various aspects of the subject specification, FIG. 10 illustrates an example wireless communication environment 1000, with associated components that can enable operation of a femtocell enterprise network in accordance with aspects described herein. Wireless communication environment 1000 includes two wireless network platforms: (i) A macro network platform 1010 that serves, or facilitates communication) with user equipment 1075 via a macro radio access network (RAN) 1070. It should be appreciated that in cellular wireless technologies (e.g., 4G, 3GPP UMTS, HSPA, 3GPP LTE, 3GPP UMB), macro network platform 1010 is embodied in a Core Network. (ii) A femto network platform 1080, which can provide communication with UE 1075 through a femto RAN 1090, linked to the femto network platform 1080 through a routing platform 102 via backhaul pipe(s) 1085, wherein backhaul pipe(s) are substantially the same a backhaul link 3853 below. It should be appreciated that femto network platform 1080 typically offloads UE 1075 from macro network, once UE 1075 attaches (e.g., through macro-to-femto handover, or via a scan of channel resources in idle mode) to femto RAN.

It is noted that RAN includes base station(s), or access point(s), and its associated electronic circuitry and deployment site(s), in addition to a wireless radio link operated in accordance with the base station(s). Accordingly, macro RAN 1070 can comprise various coverage cells like cell 1205, while femto RAN 1090 can comprise multiple femto access points. As mentioned above, it is to be appreciated that deployment density in femto RAN 1090 is substantially higher than in macro RAN 1070.

Generally, both macro and femto network platforms 1010 and 1080 include components, e.g., nodes, gateways, interfaces, servers, or platforms, that facilitate both packet-switched (PS) (e.g., internet protocol (IP), frame relay, asynchronous transfer mode (ATM)) and circuit-switched (CS) traffic (e.g., voice and data) and control generation for networked wireless communication. In an aspect of the subject innovation, macro network platform 1010 includes CS gateway node(s) 1012 which can interface CS traffic received from legacy networks like telephony network(s) 1040 (e.g., public switched telephone network (PSTN), or public land mobile network (PLMN)) or a SS7 network 1060. Circuit switched gateway 1012 can authorize and authenticate traffic (e.g., voice) arising from such networks. Additionally, CS gateway 1012 can access mobility, or roaming, data generated through SS7 network 1060; for instance, mobility data stored in a VLR, which can reside in memory 1030. Moreover, CS gateway node(s) 1012 interfaces CS-based traffic and signaling and gateway node(s) 1018. As an example, in a 3GPP UMTS network, gateway node(s) 1018 can be embodied in gateway GPRS support node(s) (GGSN).

In addition to receiving and processing CS-switched traffic and signaling, gateway node(s) 1018 can authorize and authenticate PS-based data sessions with served (e.g., through macro RAN) wireless devices. Data sessions can include traffic exchange with networks external to the macro network platform 1010, like wide area network(s) (WANs) 1050; it should be appreciated that local area network(s) (LANs) can also be interfaced with macro network platform 1010 through gateway node(s) 1018. Gateway node(s) 1018 generates packet data contexts when a data session is established. To that end, in an aspect, gateway node(s) 1018 can include a tunnel interface (e.g., tunnel termination gateway (TTG) in 3GPP UMTS network(s); not shown) which can facilitate packetized communication with disparate wireless network(s), such as Wi-Fi networks. It should be further appreciated that the packetized communication can include multiple flows that can be generated through server(s) 1014. It is to be noted that in 3GPP UMTS network(s), gateway node(s) 1018 (e.g., GGSN) and tunnel interface (e.g., TTG) comprise a packet data gateway (PDG).

Macro network platform 1010 also includes serving node(s) 1016 that convey the various packetized flows of information or data streams, received through gateway node(s) 1018. As an example, in a 3GPP UMTS network, serving node(s) can be embodied in serving GPRS support node(s) (SGSN).

As indicated above, server(s) 1014 in macro network platform 1010 can execute numerous applications (e.g., location services, online gaming, wireless banking, wireless device management . . . ) that generate multiple disparate packetized data streams or flows, and manage (e.g., schedule, queue, format . . . ) such flows. Such application(s), for example can include add-on features to standard services provided by macro network platform 1010. Data streams can be conveyed to gateway node(s) 1018 for authorization/authentication and initiation of a data session, and to serving node(s) 1016 for communication thereafter. Server(s) 1014 can also effect security (e.g., implement one or more firewalls) of macro network platform 1010 to ensure network's operation and data integrity in addition to authorization and authentication procedures that CS gateway node(s) 1012 and gateway node(s) 1018 can enact. Moreover, server(s) 1014 can provision services from external network(s), e.g., WAN 1050, or Global Positioning System (GPS) network(s) (not shown). It is to be noted that server(s) 1014 can include one or more processor configured to confer at least in part the functionality of macro network platform 1010. To that end, the one or more processor can execute code instructions stored in memory 1030, for example.

In example wireless environment 1000, memory 1030 stores information related to operation of macro network platform 1010. Information can include business data associated with subscribers; market plans and strategies, e.g., promotional campaigns, business partnerships; operational data for mobile devices served through macro network platform; service and privacy policies; end-user service logs for law enforcement; and so forth. Memory 1030 can also store information from at least one of telephony network(s) 1040, WAN(s) 1050, or SS7 network 1060, enterprise NW(s) 1065, or service NW(s) 1067.

Femto gateway node(s) 1084 have substantially the same functionality as PS gateway node(s) 1018. Additionally, femto gateway node(s) 1084 can also include substantially all functionality of serving node(s) 1016. In an aspect, femto gateway node(s) 1084 facilitates handover resolution, e.g., assessment and execution. Further, control node(s) 1020 can receive handover requests and relay them to a handover component (not shown) via gateway node(s) 1084. According to an aspect, control node(s) 1020 can support RNC capabilities.

Server(s) 1082 have substantially the same functionality as described in connection with server(s) 1014. In an aspect, server(s) 1082 can execute multiple application(s) that provide service (e.g., voice and data) to wireless devices served through femto RAN 1090. Server(s) 1082 can also provide security features to femto network platform. In addition, server(s) 1082 can manage (e.g., schedule, queue, format . . . ) substantially all packetized flows (e.g., IP-based, frame relay-based, ATM-based) it generates in addition to data received from macro network platform 1010. It is to be noted that server(s) 1082 can include one or more processor configured to confer at least in part the functionality of macro network platform 1010. To that end, the one or more processor can execute code instructions stored in memory 1086, for example.

Memory 1086 can include information relevant to operation of the various components of femto network platform 1080. For example operational information that can be stored in memory 1086 can comprise, but is not limited to, subscriber information; contracted services; maintenance and service records; femto cell configuration (e.g., devices served through femto RAN 1090; access control lists, or white lists); service policies and specifications; privacy policies; add-on features; and so forth.

It is noted that femto network platform 1080 and macro network platform 1010 can be functionally connected through one or more reference link(s) or reference interface(s). In addition, femto network platform 1080 can be functionally coupled directly (not illustrated) to one or more of external network(s) 1040, 1050, 1060, 1065 or 1067. Reference link(s) or interface(s) can functionally link at least one of gateway node(s) 1084 or server(s) 1086 to the one or more external networks 1040, 1050, 1060, 1065 or 1067.

Figure 11:
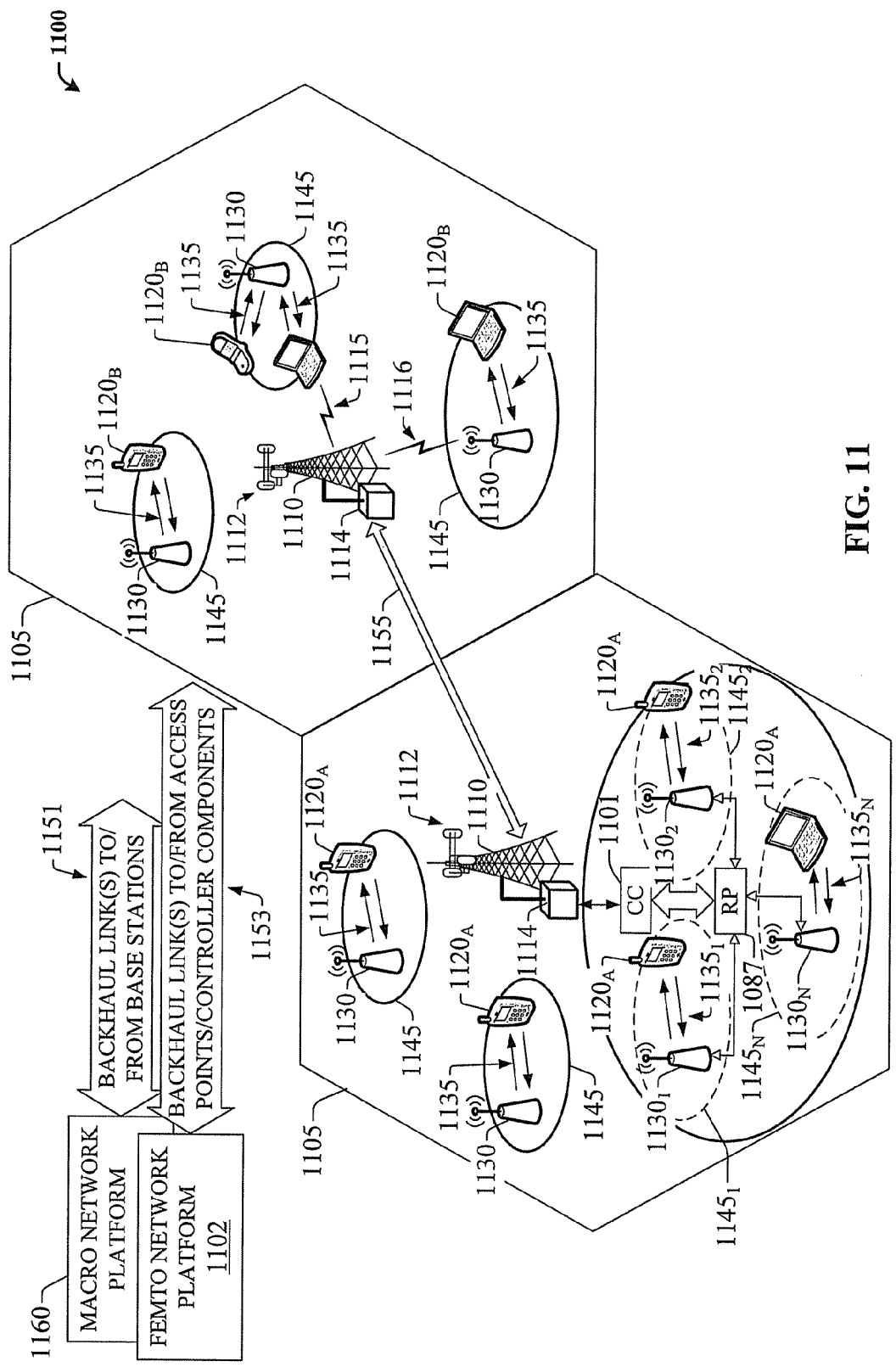
FIG. 11 illustrates a schematic deployment of a macro cell for wireless coverage in accordance with aspects of the subject specification.

FIG. 11 illustrates a wireless environment that includes macro cells and femtocells for wireless coverage in accordance with aspects described herein. In wireless environment 1150, two areas 1105 represent "macro" cell coverage; each macro cell is served by a base station 1110. It can be appreciated that macro cell coverage area 1105 and base station 1110 can include functionality, as more fully described herein, for example, with regard to system 1100. Macro coverage is generally intended to serve mobile wireless devices, like UE $1120_A$, $1120_B$, in outdoors locations. An over-the-air wireless link 115 provides such coverage, the wireless link 1215 comprises a downlink (DL) and an uplink (UL), and utilizes a predetermined band, licensed or unlicensed, of the radio frequency (RF) spectrum. As an example, UE $1120_A$, $1120_B$ can be a 3GPP Universal Mobile Telecommunication System (UMTS) mobile phone. It is noted that a set of base stations, its associated electronics, circuitry or components, base stations control component(s), and wireless links operated in accordance to respective base stations in the set of base stations form a radio access network (RAN). In addition, base station 1110 communicates via backhaul link(s) 1151 with a macro network platform 1160, which in cellular wireless technologies (e.g., 3rd Generation Partnership Project (3GPP) Universal Mobile Telecommunication System (UMTS), Global System for Mobile Communication (GSM)) represents a core network.

In an aspect, macro network platform 1160 controls a set of base stations 1110 that serve either respective cells or a number of sectors within such cells. Base station 1110 comprises radio equipment 1114 for operation in one or more radio technologies, and a set of antennas 1112 (e.g., smart antennas, microwave antennas, satellite dish(es) . . . ) that can serve one or more sectors within a macro cell 1105. It is noted that a set of radio network control node(s), which can be a part of macro network platform; a set of base stations (e.g., Node B 1110) that serve a set of macro cells 1105; electronics, circuitry or components associated with the base stations in the set of base stations; a set of respective OTA wireless links (e.g., links 1115 or 1116) operated in accordance to a radio technology through the base stations; and backhaul link(s) 1155 and 1151 form a macro radio access network (RAN). Macro network platform 1160 also communicates with other base stations (not shown) that serve other cells (not shown). Backhaul link(s) 1151 or 1153 can include a wired backbone link (e.g., optical fiber backbone, twisted-pair line, T1/E1 phone line, a digital subscriber line (DSL) either synchronous or asynchronous, an asymmetric ADSL, or a coaxial cable . . . ) or a wireless (e.g., line-of-sight (LOS) or non-LOS) backbone link. Backhaul pipe(s) 1155 link disparate base stations 1110. According to an aspect, backhaul link 1153 can connect multiple femto access points 1130 and/or controller components (CC) 1101 to the femto network platform 1102. In one example, multiple femto APs can be connected to a routing platform (RP) 1087, which in turn can be connect to a controller component (CC) 1101. Typically, the information from UEs $1120_A$ can be routed by the RP 102, for example, internally, to another UE $1120_A$ connected to a disparate femto AP connected to the RP 1087, or, externally, to the femto network platform 1102 via the CC 1101, as discussed in detail supra.

In wireless environment 1150, within one or more macro cell(s) 1105, a set of femtocells 1145 served by respective femto access points (APs) 1130 can be deployed. It can be appreciated that, aspects of the subject innovation are geared to femtocell deployments with substantive femto AP density, e.g., $10^4$-$10^7$ femto APs 1130 per base station 1110. According to an aspect, a set of femto access points $1130_1$-$3730_N$, with N a natural number, can be functionally connected to a routing platform 1087, which can be functionally coupled to a controller component 1101. The controller component 1101 can be operationally linked to the femto network platform 330 by employing backhaul link(s) 1153. Accordingly, UEs UE $3720_A$ connected to femto APs $1130_1$-$3830_N$ can communicate internally within the femto enterprise via the routing platform (RP) 1087 and/or can also communicate with the femto network platform 1102 via the RP 1087, controller component 1101 and the backhaul link(s) 1153. It can be appreciated that although only one femto enterprise is depicted in FIG. 11, multiple femto enterprise networks can be deployed within a macro cell 1105.

It is noted that while various aspects, features, or advantages described herein have been illustrated through femto access point(s) and associated femto coverage, such aspects and features also can be exploited for home access point(s) (HAPs) that provide wireless coverage through substantially any, or any, disparate telecommunication technologies, such as for example Wi-Fi (wireless fidelity) or picocell telecommunication. Additionally, aspects, features, or advantages of the subject innovation can be exploited in substantially any wireless telecommunication, or radio, technology; for example, Wi-Fi, Worldwide Interoperability for Microwave Access (WiMAX), Enhanced General Packet Radio Service (Enhanced GPRS), 3GPP LTE, 3GPP2 UMB, 3GPP UMTS, HSPA, HSDPA, HSUPA, or LTE Advanced. Moreover, substantially all aspects of the subject innovation can include legacy telecommunication technologies.

Figure 12:
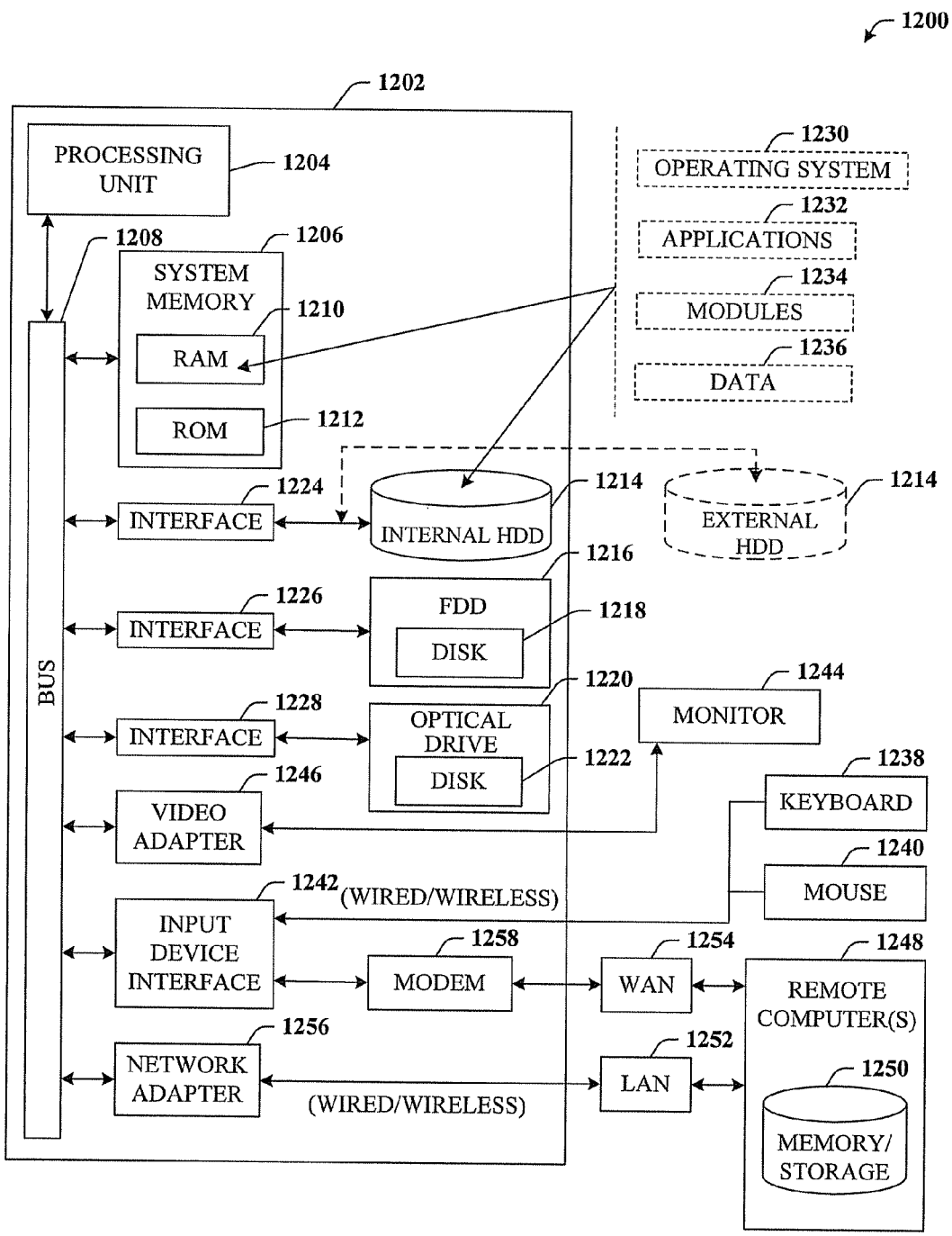
FIG. 12 illustrates a block diagram of a computer operable to execute a portion of the disclosed architecture.

Referring now to FIG. 12, there is illustrated a block diagram of an exemplary computer system operable to execute the disclosed architecture. In order to provide additional context for various aspects of the disclosed subject matter, FIG. 12 and the following discussion are intended to provide a brief, general description of a suitable computing environment 1200 in which the various aspects of the disclosed subject matter can be implemented. Additionally, while the disclosed subject matter described above may be suitable for application in the general context of computer-executable instructions that may run on one or more computers, those skilled in the art will recognize that the disclosed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the disclosed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include either volatile or nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 12, the exemplary environment 1200 for implementing various aspects of the disclosed subject matter includes a computer 1202, the computer 1202 including a processing unit 1204, a system memory 1206 and a system bus 1208. The system bus 1208 couples to system components including, but not limited to, the system memory 1206 to the processing unit 1204. The processing unit 1204 can be any of various commercially available processors. Dual microprocessors and other multi-processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during start-up. The RAM 1212 can also include a high-speed RAM such as static RAM for caching data.

The computer 1202 further includes an internal hard disk drive (HDD) 1214 (e.g., EIDE, SATA), which internal hard disk drive 1214 may also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE1394 interface technologies. Other external drive connection technologies are within contemplation of the subject matter disclosed herein.

The drives and their associated computer-readable media provide nonvolatile storage of data, data structures, computer-executable instructions, and so forth. For the computer 1202, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed subject matter.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is appreciated that the disclosed subject matter can be implemented with various commercially available operating systems or combinations of operating systems.

A user can enter commands and information into the computer 1202 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE1394 serial port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers, etc.

The computer 1202 may operate in a networked environment using logical connections via wired and/or wireless communications to one or more remote computers, such as a remote computer(s) 1248. The remote computer(s) 1248 can be a workstation, a server computer, a router, a personal computer, a mobile device, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1202 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

Various aspects or features described herein can be implemented as a method, apparatus, or article of manufacture using standard programming and/or engineering techniques. In addition, various aspects disclosed in the subject specification can also be implemented through program modules stored in a memory and executed by a processor, or other combination of hardware and software, or hardware and firmware. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disc (CD), digital versatile disc (DVD), blu-ray disc (BD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the internet or a local area network (LAN). Of course, those skilled in the art will recognize many modifications may be made to this configuration without departing from the scope or spirit of the disclosed subject matter.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system, comprising:
   a processor; and
   a memory that stores executable instructions that, when executed by the processor, facilitate performance of operations, comprising:
   receiving, from a device of devices of a group of communication network platforms, request data indicative of a request for first data of data stored within data stores that are coupled via network devices of a wide area network, wherein the request data is formatted according to a native protocol associated with a communication network platform of the group of communication network platforms and specifies access to the first data according to a platform-specific schema associated with the communication network platform, and wherein the first data is stored in a first data store of the data stores according to a common schema;
   translating the request data according to a common protocol that specifies access to the first data according to the common schema to generate modified request data that is employable to access the first data; and
   in response to determining a change in residence data linked to a subscriber identity associated with the first data, facilitating a transfer of the first data from the first data store of the data stores to a second data store of the data stores, wherein the residence data is indicative of a geographical address associated with the subscriber identity, and wherein the second data store is determined to be located closer to the geographical address than the first data store.

2. The system of claim 1, wherein the facilitating the transfer comprises facilitating the transfer in response to determining that the change in the residence data satisfies a defined timing criterion.

3. The system of claim 1, wherein the operations further comprise:
   providing the modified request data to the second data store;
   receiving response data indicative of a response to the modified request data in accordance with the common schema;
   translating the response data to generate modified response data in accordance with the native protocol; and
   facilitating a transmission of the modified response data to the device.

4. The system of claim 1, wherein the devices of the group of communication network platforms comprise at least two devices of: a wireless network platform, a wireline network platform, an Internet protocol multimedia subsystem network platform, a broadband network platform, or an emergency network platform.

5. The system of claim 1, wherein the receiving comprises receiving the request data via an interface device that comprises respective interfaces that facilitate communication support for the group of communication network platforms.

6. The system of claim 5, wherein the interfaces are data-less and support protocols comprising at least one of a lightweight data access protocol, a simple object access protocol, an extensible markup language, a hypertext transfer protocol, or a simple network management protocol.

7. The system of claim 1, wherein the operations further comprise:
   maintaining index data indicative of respective storage locations of defined portions of the data.

8. The system of claim 1, wherein the data stores comprise data repositories that redundantly store the data.

9. The system of claim 1, wherein the data stores further comprise layer data that comprises:
   backend layer data describing backend stores for a first logical wide area network;
   interface layer data describing interface devices of a second logical wide area network; and
   data management layer data describing data management devices of a third logical wide area network.

10. The system of claim 9, wherein the backend stores are physically distributed among geographic locations, and a first portion of the layer data is stored at a first geographic location of the geographic locations and a second portion of the layer data is stored at a second geographic location of the geographic locations.

11. The system of claim 10, wherein a layer described by the layer data is independently updateable and an update to the layer does not require an associated update to other layers of the layer data.

12. A machine-readable storage medium comprising executable instructions that, when executed by a processor, facilitate performance of operations, comprising:
   facilitating communication with data stores that maintain data associated with the devices of different communication network platforms, wherein the data is integrated in the data stores according to a first schema, and wherein the data stores are coupled via wide area network devices;
   in response to determining a change in residence data linked to a subscriber identity associated with first data of the data that is stored in a first data store of the data stores, facilitating a transfer of the first data from the first data store to a second data store of the data stores, wherein the residence data is indicative of a geographical address, and wherein a first distance between the geographical address and the second data store is determined to be less than a second distance between the geographical address and the first data store;
   receiving, from a device of the devices of the different communication network platforms, request data indicative of a request for the first data, wherein the request specifies access to the first data according to a second schema that is platform-specific for a communication network platform of the different communication network platforms and differs from the first schema; and
   transforming the request data according to a common protocol that specifies access to the first data according to the first schema, wherein the transforming results in modified request data that is to be transmitted to second data store.

13. The machine-readable storage medium of claim 12, wherein the operations further comprise:
   determining location data indicative of a location of the first data within the data stores, and wherein the location data is employable to access the first data.

14. The machine-readable storage medium of claim 13, wherein the location data is determined based on second data of the data that is determined to be related to the first data.

15. The machine-readable storage medium of claim 13, wherein the location data is determined based on information associated with a service related to the request data.

16. The machine-readable storage medium of claim 13, wherein the location data is determined based on information associated with an application that generates the request data.

17. A method, comprising:
   facilitating, by a system comprising a processor, communication between communication network platforms and data stores that maintain data associated with the communication network platforms and store the data according to a unified schema;
   in response to determining a change in residence data linked to a subscriber identity associated with a portion of the data that has been stored in a first data store of the data stores, moving, by the system, the portion of the data from the first data store to a second data store of the data stores, wherein the residence data is indicative of a geographical location associated with the subscriber identity, and wherein the second data store is determined to be located closer to the geographical location than the first data store;
   receiving, by the system and from a device of a communication network platform of the communication network platforms, query data representing a query for the portion of the data, wherein the query data is formatted according to a platform-specific protocol associated with the communication network platform and specifies access to the portion of the data according to a platform-specific schema that is platform-specific for the communication network platform; and
   translating, by the system, the query data according to a unified protocol that specifies access to the portion of the data according to the unified schema, wherein the translating results in modified query data that is directed to the second data store.

18. The method of claim 17, further comprising:
   directing, by the system, the modified query data to the second data store;
   receiving, by the system, response data representing a response to the modified query data in accordance with the unified schema;
   translating, by the system, the response data to modified response data in accordance with the platform-specific protocol; and
   providing, by the system, the modified response data to the device.

19. The method of claim 17, wherein the moving comprises moving the portion of the data in response to determining that the change in the residence data satisfies a defined timing criterion.

20. The method of claim 17, further comprising:
   managing, by the system, layer data comprising managing backend layer data associated with the data stores.

* * * * *